US012614353B2

(12) United States Patent
Hasan et al.

(10) Patent No.: US 12,614,353 B2
(45) Date of Patent: Apr. 28, 2026

(54) TECHNIQUES FOR GENERATING AND APPLYING 3D TINT BANDS TO A MAP

(71) Applicant: Apple Inc., Cupertino, CA (US)

(72) Inventors: Syed Mohsin Hasan, San Jose, CA (US); David Bryson, San Jose, CA (US); Vikram M. Puttichanda, Fremont, CA (US); Miguel C. Vieira, San Carlos, CA (US); Daniel W. Zaide, San Jose, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 18/075,231

(22) Filed: Dec. 5, 2022

(65) Prior Publication Data

US 2023/0368469 A1 Nov. 16, 2023

Related U.S. Application Data

(60) Provisional application No. 63/364,491, filed on May 10, 2022.

(51) Int. Cl.
*G06T 17/20* (2006.01)
*G06T 17/05* (2011.01)
*G06F 16/29* (2019.01)

(52) U.S. Cl.
CPC .............. *G06T 17/20* (2013.01); *G06T 17/05* (2013.01); *G06F 16/29* (2019.01)

(58) Field of Classification Search
CPC .................................. G06T 17/20; G06T 17/05

USPC ......................................................... 345/419
See application file for complete search history.

(56) References Cited

U.S. PATENT DOCUMENTS

| | | | | |
|---|---|---|---|---|
| 8,990,204 | B1 * | 3/2015 | Ward ...................... | G06F 16/22 |
| | | | | 707/758 |
| 2016/0234475 | A1 * | 8/2016 | Courchesne .......... | H04N 7/157 |
| 2018/0307754 | A1 * | 10/2018 | Somlai-Fischer ...... | G09G 5/006 |
| 2023/0169729 | A1 * | 6/2023 | Fleisher ................. | G06T 17/05 |
| | | | | 345/419 |

OTHER PUBLICATIONS

Goethem et al., Stenomaps: Shorthand for shapes, IEEE Transactions on Visualization and Computer Graphics, vol. 20, No. 12, Dec. 2014, pp. 1-10 (Year: 2014).*

* cited by examiner

*Primary Examiner* — Samantha (Yuehan) Wang
(74) *Attorney, Agent, or Firm* — Kilpatrick Townsend & Stockton LLP

(57) ABSTRACT

Areas of interest on three-dimensional maps can be made visually distinct using three-dimensional tint band meshes that overlay other three-dimensional meshes, for example three-dimensional meshes providing terrain, elevation, and infrastructure data. Characteristics of the three-dimensional tint band meshes may be dynamically updated for visual distinctiveness. When overlaying three-dimensional tint band meshes, the overlay operation can use connectivity information of the three-dimensional meshes to increase performance.

20 Claims, 11 Drawing Sheets

300

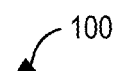
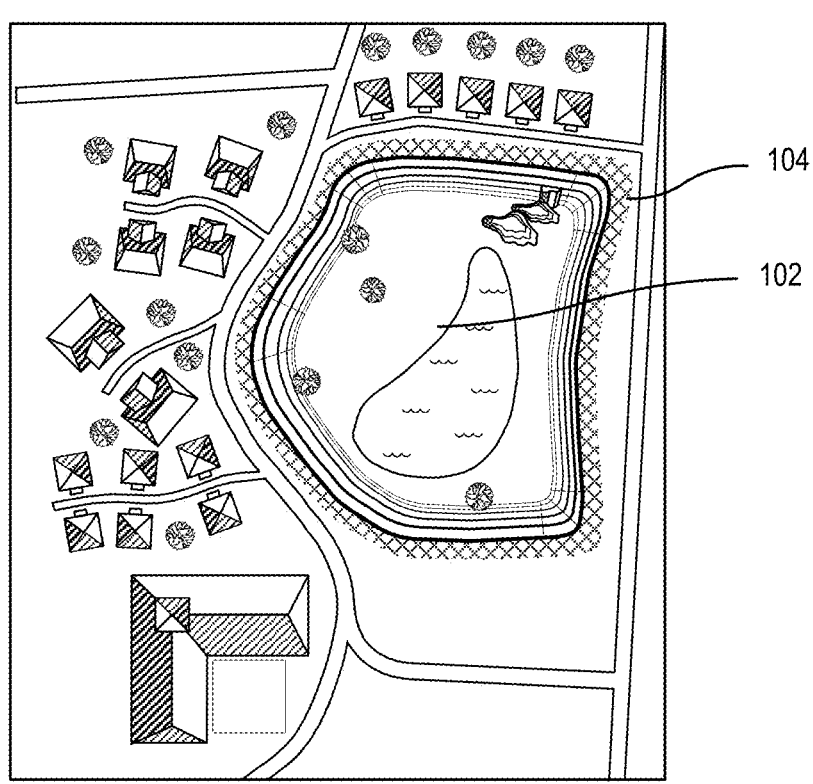
FIG. 1

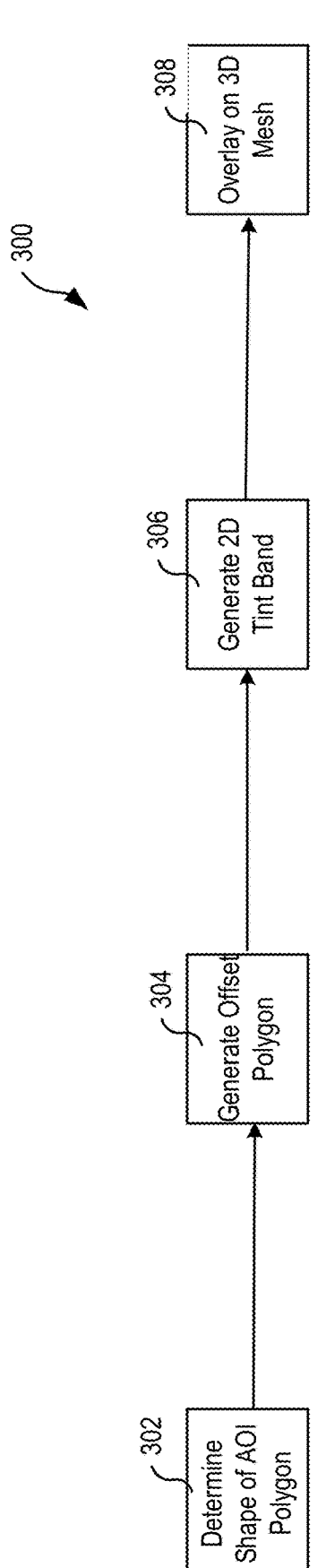
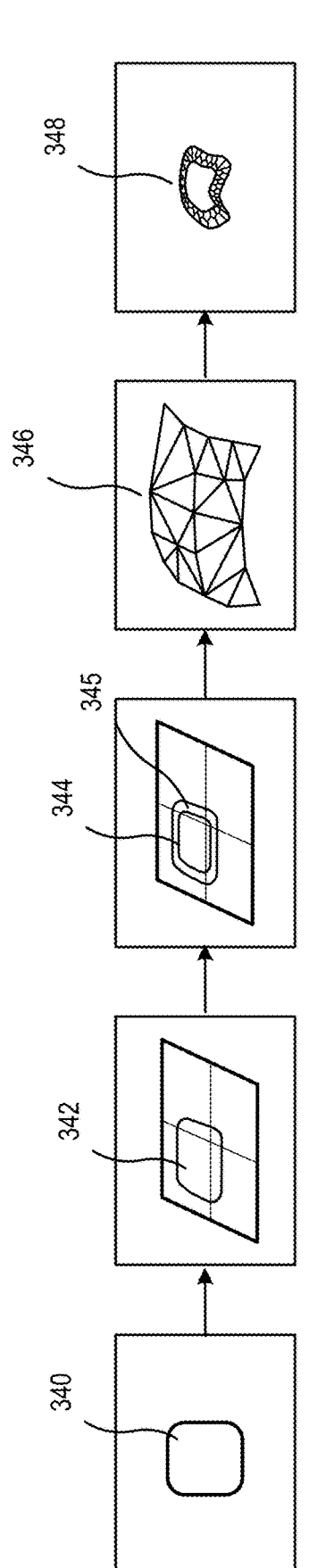
FIG. 3

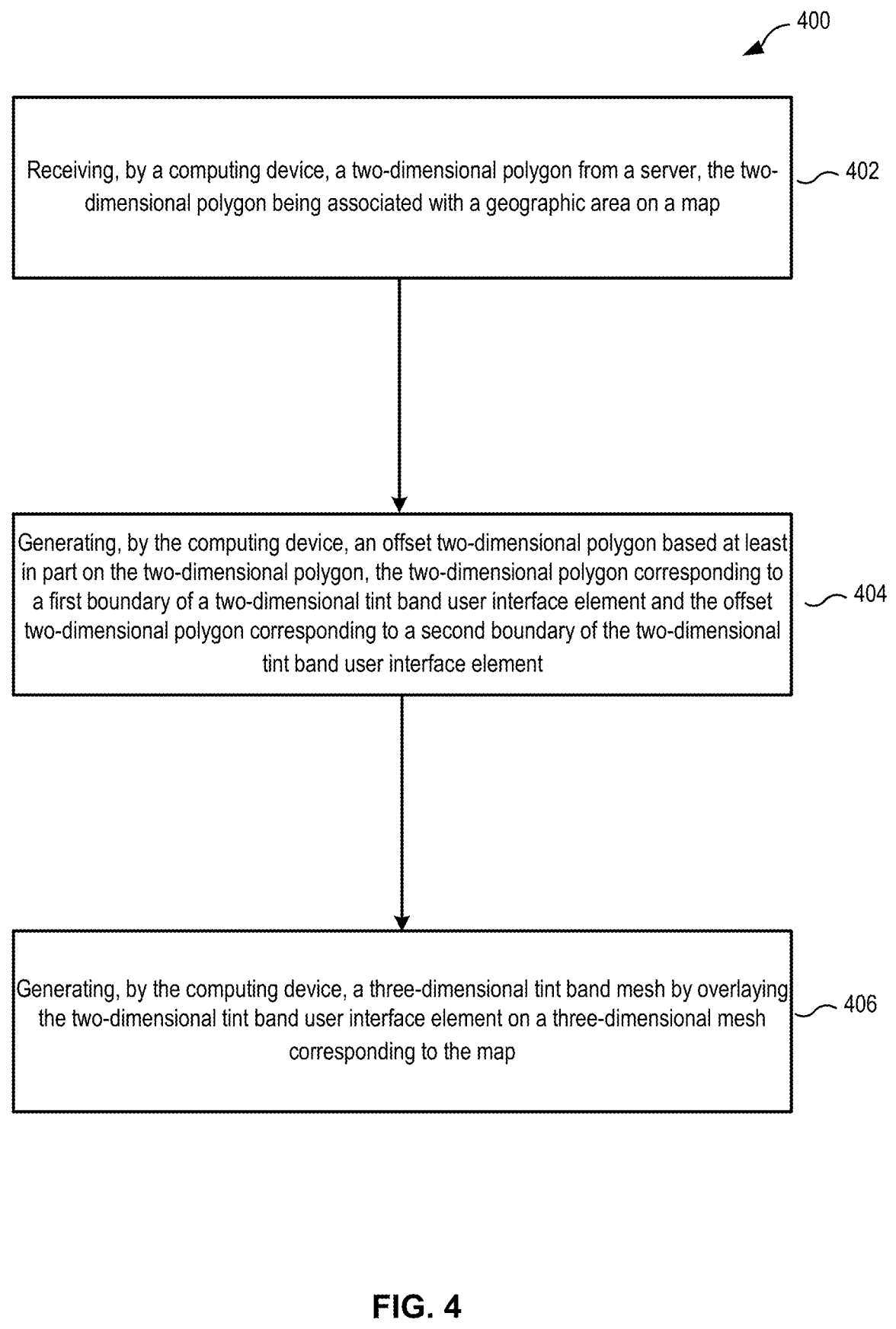

400

Receiving, by a computing device, a two-dimensional polygon from a server, the two-dimensional polygon being associated with a geographic area on a map ⟋⟍ 402

Generating, by the computing device, an offset two-dimensional polygon based at least in part on the two-dimensional polygon, the two-dimensional polygon corresponding to a first boundary of a two-dimensional tint band user interface element and the offset two-dimensional polygon corresponding to a second boundary of the two-dimensional tint band user interface element ⟋⟍ 404

Generating, by the computing device, a three-dimensional tint band mesh by overlaying the two-dimensional tint band user interface element on a three-dimensional mesh corresponding to the map ⟋⟍ 406

FIG. 4

500
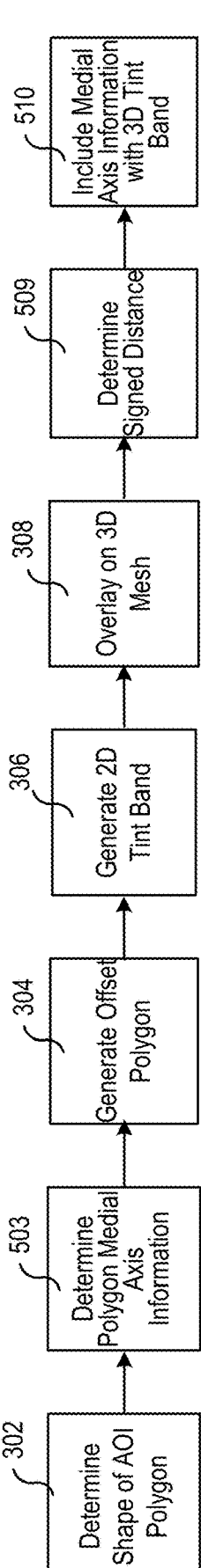
302   Determine Shape of AOI Polygon
503   Determine Polygon Medial Axis Information
304   Generate Offset Polygon
306   Generate 2D Tint Band
308   Overlay on 3D Mesh
509   Determine Signed Distance
510   Include Medial Axis Information with 3D Tint Band
FIG. 5

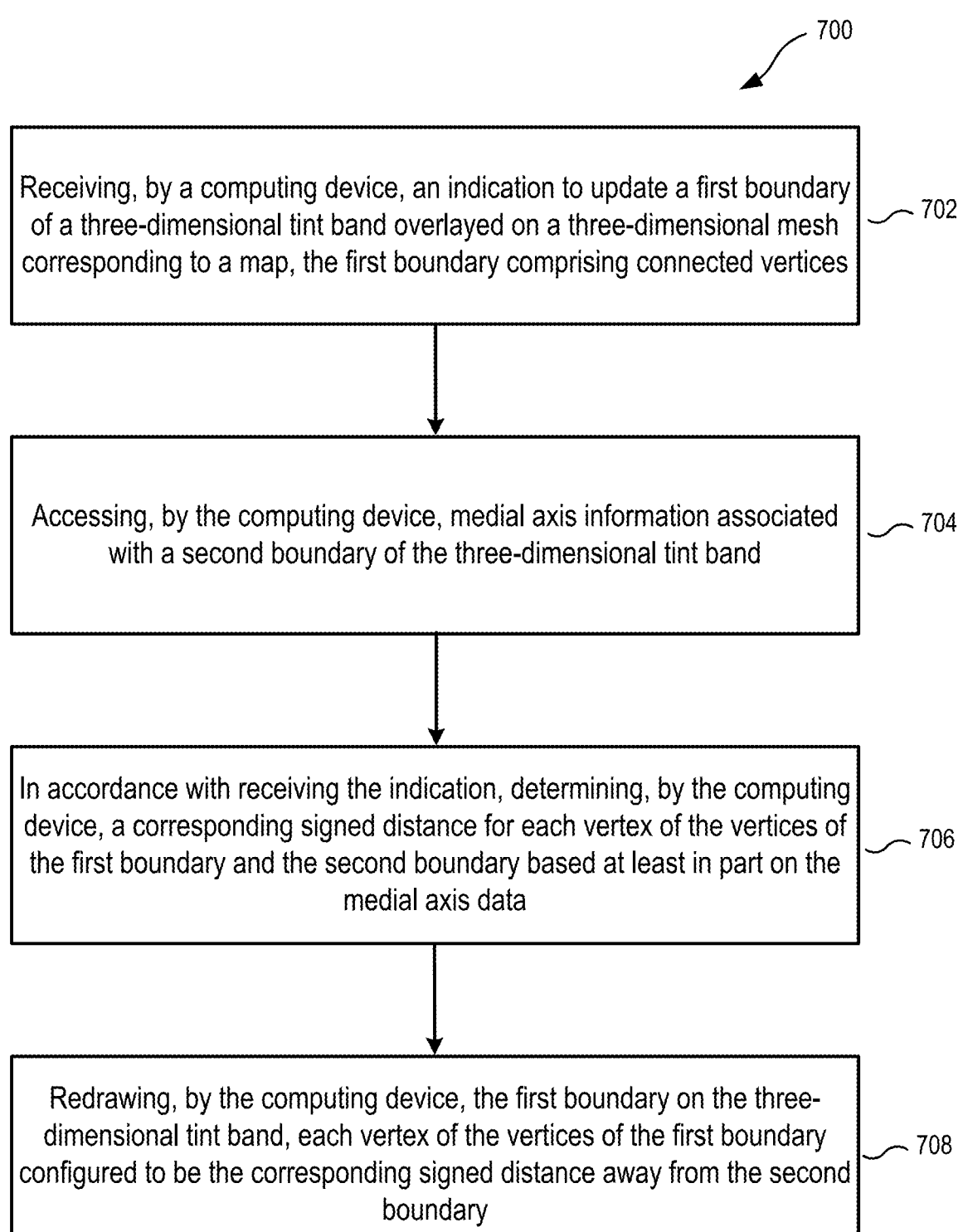

700

Receiving, by a computing device, an indication to update a first boundary of a three-dimensional tint band overlayed on a three-dimensional mesh corresponding to a map, the first boundary comprising connected vertices — 702

Accessing, by the computing device, medial axis information associated with a second boundary of the three-dimensional tint band — 704

In accordance with receiving the indication, determining, by the computing device, a corresponding signed distance for each vertex of the vertices of the first boundary and the second boundary based at least in part on the medial axis data — 706

Redrawing, by the computing device, the first boundary on the three-dimensional tint band, each vertex of the vertices of the first boundary configured to be the corresponding signed distance away from the second boundary — 708

FIG. 7

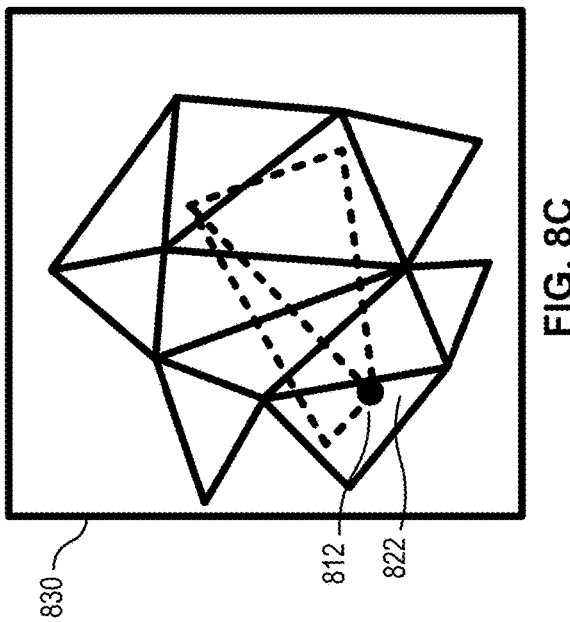
FIG. 8C
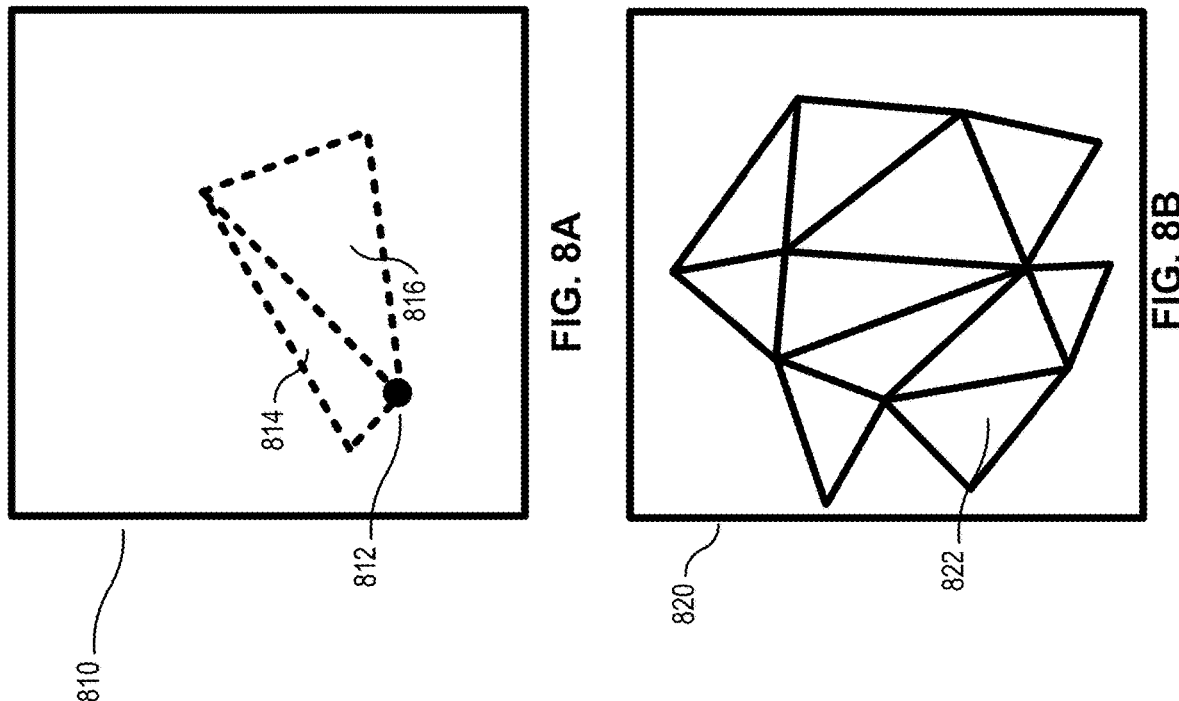
FIG. 8A
FIG. 8B

900

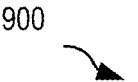

Receiving, by the computing device, a three-dimensional mesh, the three-dimensional mesh comprising a first set of segments, the three-dimensional mesh including connectivity information identifying how segments of the first set of segments are connected ⟋ 902

Receiving, by the computing device, a two-dimensional mesh, the two-dimensional mesh comprising a second set of segments ⟋ 904

Overlaying, by the computing device, the two-dimensional mesh on the three-dimensional mesh based at least upon the connectivity information of the three-dimensional mesh ⟋ 906

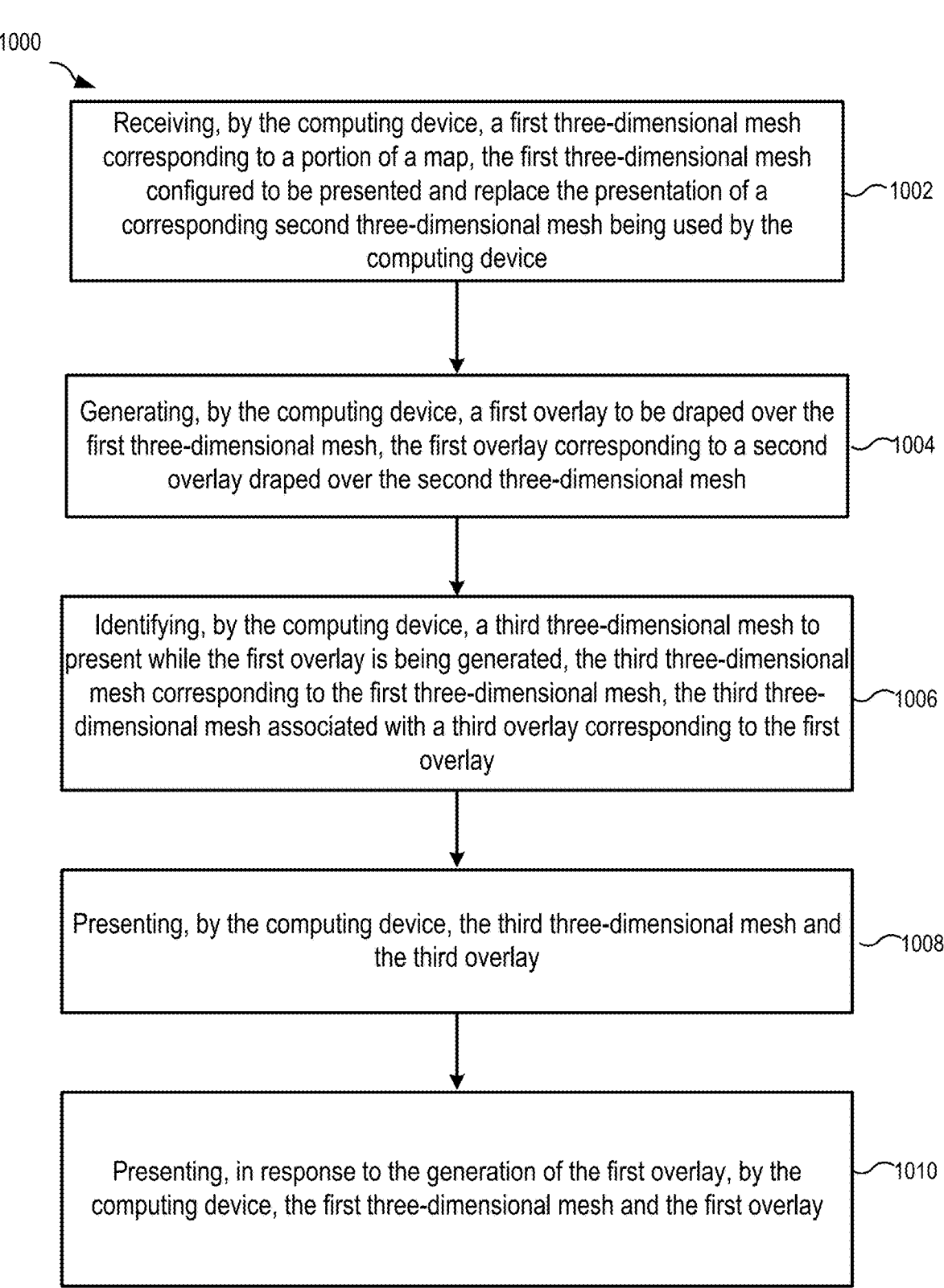

Receiving, by the computing device, a first three-dimensional mesh corresponding to a portion of a map, the first three-dimensional mesh configured to be presented and replace the presentation of a corresponding second three-dimensional mesh being used by the computing device                                                           ⌐1002

Generating, by the computing device, a first overlay to be draped over the first three-dimensional mesh, the first overlay corresponding to a second overlay draped over the second three-dimensional mesh                                                           ⌐1004

Identifying, by the computing device, a third three-dimensional mesh to present while the first overlay is being generated, the third three-dimensional mesh corresponding to the first three-dimensional mesh, the third three-dimensional mesh associated with a third overlay corresponding to the first overlay                                                           ⌐1006

Presenting, by the computing device, the third three-dimensional mesh and the third overlay                                                           ⌐1008

Presenting, in response to the generation of the first overlay, by the computing device, the first three-dimensional mesh and the first overlay                                                           ⌐1010

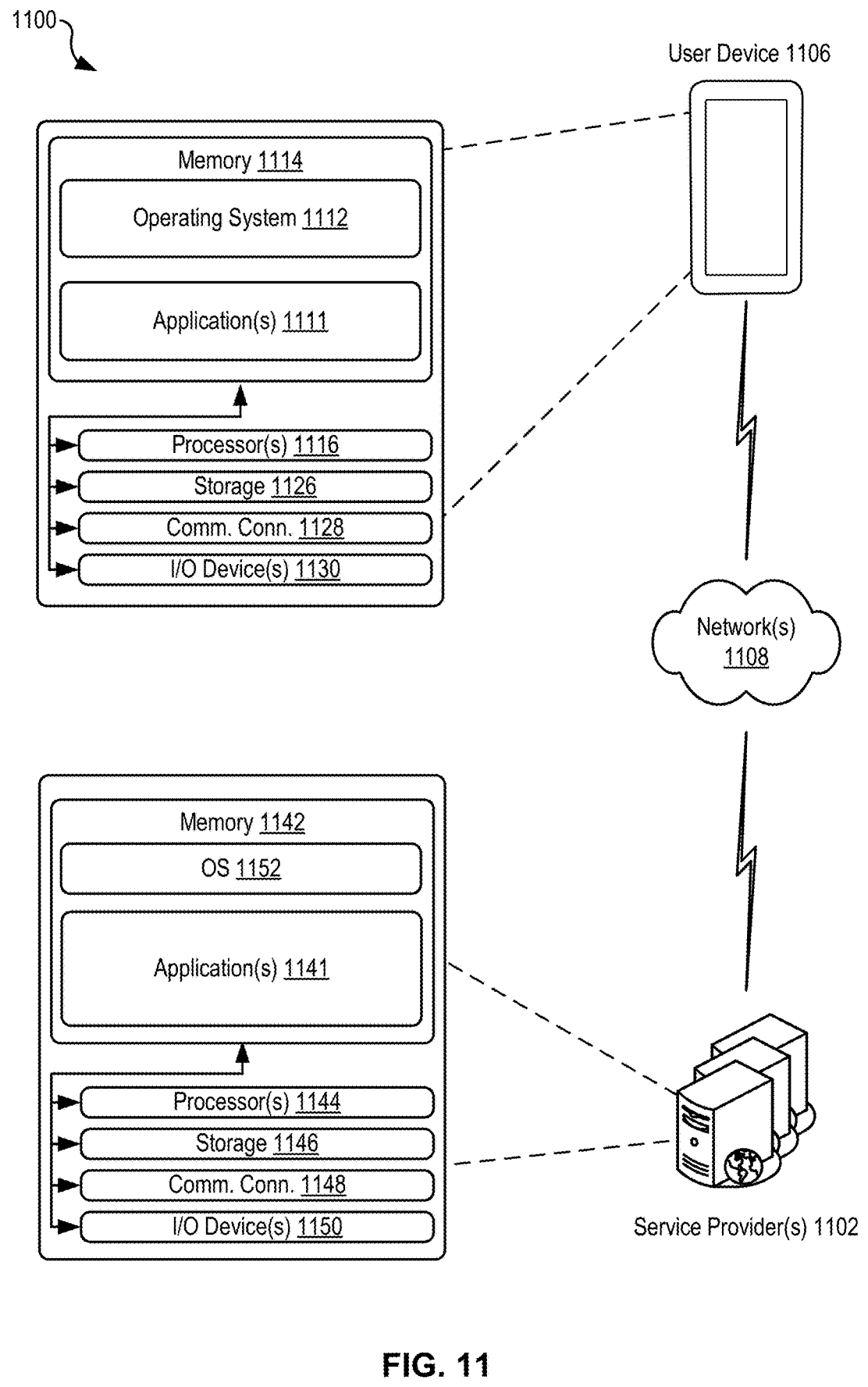

User Device 1106

Memory 1114

Operating System 1112

Application(s) 1111

Processor(s) 1116

Storage 1126

Comm. Conn. 1128

I/O Device(s) 1130

Network(s) 1108

Memory 1142

OS 1152

Application(s) 1141

Processor(s) 1144

Storage 1146

Comm. Conn. 1148

I/O Device(s) 1150

Service Provider(s) 1102

FIG. 11

TECHNIQUES FOR GENERATING AND APPLYING 3D TINT BANDS TO A MAP

BACKGROUND

With the proliferation of mobile devices, electronic maps are used by a variety of services and applications. Some uses for electronic maps can include directions (such as for driving) or for presenting information related to specific geographic locations. Electronic maps can use a variety of visual methods to communicate distinctions and information regarding the map.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method includes receiving, by a computing device, a two-dimensional polygon from a server, the two-dimensional polygon being associated with a geographic area on a map. The method also includes generating, by the computing device, an offset two-dimensional polygon based at least in part on the two-dimensional polygon, the two-dimensional polygon corresponding to a first boundary of a two-dimensional tint band user interface element and the offset two-dimensional polygon corresponding to a second boundary of the two-dimensional tint band user interface element. The method also includes generating, by the computing device, a three-dimensional tint band mesh by overlaying the two-dimensional tint band user interface element on a three-dimensional mesh corresponding to the map. Other embodiments of this aspect include corresponding computer systems, apparatus, and computer programs recorded on one or more computer storage devices, each configured to perform the actions of the methods.

One general aspect includes a computer-implemented method. The computer-implemented method includes receiving, by a computing device, an indication to update a first boundary of a three-dimensional tint band overlayed on a three-dimensional mesh corresponding to a map, the first boundary may include connected vertices. The method also includes accessing, by the computing device, medial axis information associated with a second boundary of the three-dimensional tint band. The method also includes in accordance with receiving the indication, determining, by the computing device, a corresponding signed distance for each vertex of the vertices of the first boundary and the second boundary based at least in part on the medial axis data. The method also includes redrawing, by the computing device, the first boundary on the three-dimensional tint band, each vertex of the vertices of the first boundary configured to be the corresponding signed distance away from the second boundary. Other embodiments of this aspect include corresponding computer systems, apparatus, and computer programs recorded on one or more computer storage devices, each configured to perform the actions of the methods.

One general aspect includes a computer-implemented method. The computer-implemented method includes receiving, by the computing device, a three-dimensional mesh, the three-dimensional mesh may include a first set of segments, the three-dimensional mesh including connectivity information identifying how segments of the first set of segments are connected. The method also includes receiving, by the computing device, a two-dimensional mesh, the two-dimensional mesh may include a second set of segments. The method also includes overlaying, by the computing device, the two-dimensional mesh on the three-dimensional mesh based at least upon the connectivity information of the three-dimensional mesh. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 1 illustrates a diagram for illustrating the techniques described herein, according to an embodiment of the present disclosure.

FIG. 3 illustrates a block diagram and a simplified flow diagram for performing the techniques described herein, according to an embodiment of the present disclosure.

FIG. 4 illustrates a simplified flow diagram for illustrating the techniques described herein, according to an embodiment of the present disclosure.

FIG. 5 illustrates a simplified flow diagram for performing the techniques described herein, according to an embodiment of the present disclosure.

FIG. 7 illustrates a simplified flow diagram of user interface for illustrating the techniques described herein, according to an embodiment of the present disclosure.

FIGS. 8A, 8B, and 8C illustrate diagrams for describing the techniques described herein, according to an embodiment of the present disclosure.

FIG. 9 illustrates a simplified flow diagram for performing the techniques described herein, according to an embodiment of the present disclosure.

FIG. 10 illustrates a simplified flow diagram for performing the techniques described herein, according to an embodiment of the present disclosure.

FIG. 11 illustrates an example architecture or environment configured to implement the techniques described herein, according to an embodiment of the present disclosure.

DETAILED DESCRIPTION OF THE INVENTION

Figure 2:
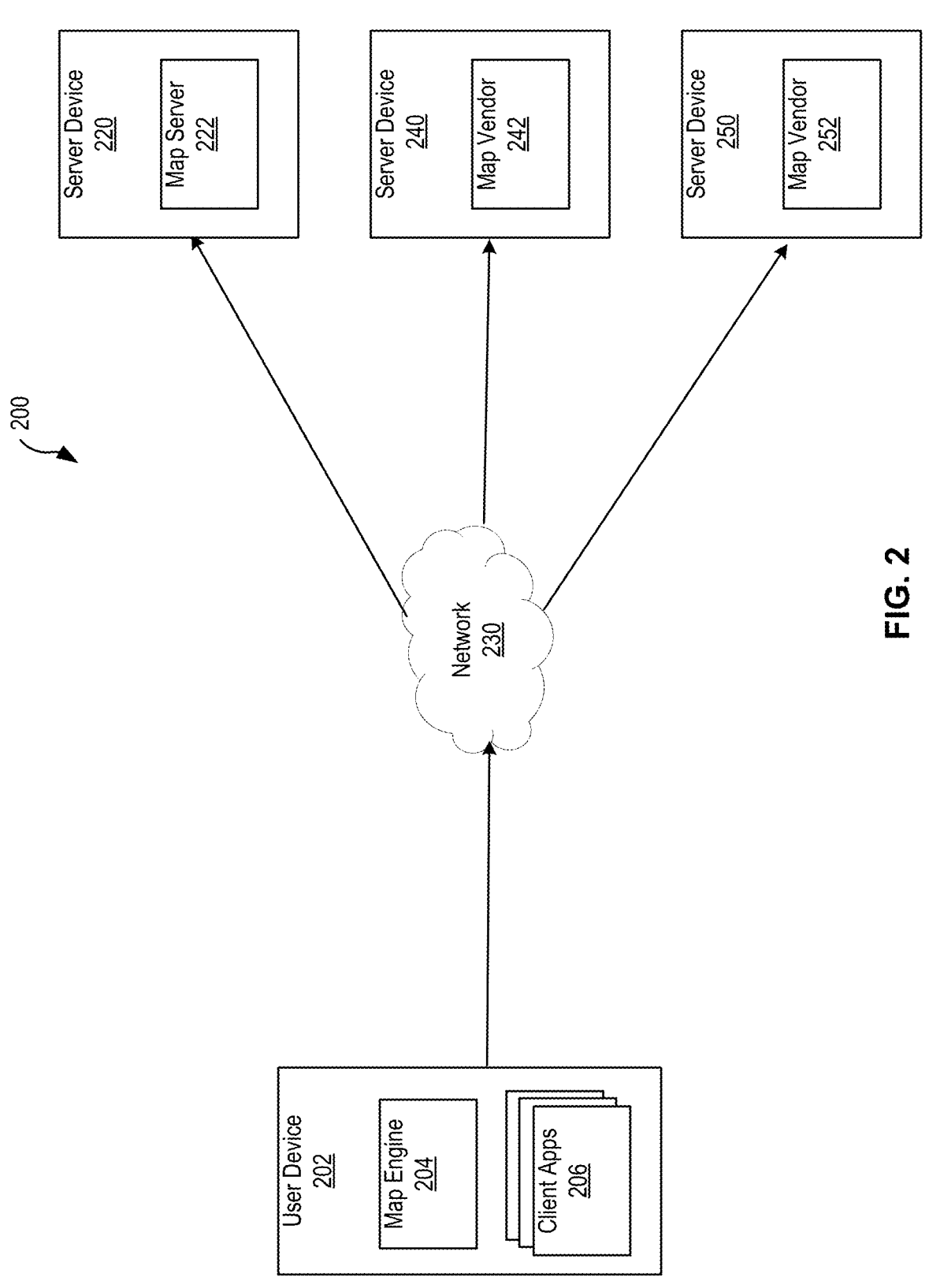
FIG. 2 illustrates a block diagram for illustrating the techniques described herein, according to an embodiment of the present disclosure.

Certain embodiments of the present disclosure relate to devices, computer-readable medium, and methods for implementing various techniques for generating and applying tint bands to electronic maps. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

On a map view, for example, an electronic map view, there can be a variety of features shown, for example buildings, homes, roads, water features, vegetation, and elevation. Map views can have varying levels of detail and may omit one or more of such features. In some implementations, the map view could be a three-dimensional map view where depth and elevation information can be presented, simulated, or viewed. For example, the terrain of a map can be shown on a three-dimensional map allowing for mountains, valleys, and other variations in height and elevation to be shown in the map view. For example, a map view can be from a bird's eye view, or a view looking down on the featured location. Map views can also be adjusted to view locations from other perspectives, angles, or views. For example, a map view could be from a 45-degree angle from the horizon, sea level, or flat ground. Similarly, a map view could be zoomed out to view a larger location at a higher zoom level or zoomed in to view a smaller location at a lower zoom level. In some examples, there may be one or more respective zoom levels, corresponding to relative amounts of zoom. The variation in viewing angle and perspective and zoom can lead to variation in the number of features viewable on the map.

An electronic map can be composed of layers with each layer providing different details and/or features. Some of these layers can be represented as three-dimensional meshes. For example, a terrain layer can be a terrain three-dimensional mesh, or terrain mesh, to simulate the variation in elevation and height of a location. There can also be a three-dimensional building mesh which provides simulated heights of buildings in a map view.

Three dimensional meshes can be used to create surfaces in three dimensions by being formed by a series of vertices and edges. Connections are created between the vertices to outline the surfaces created by the three-dimensional mesh. For example, a three-dimensional mesh can be used to create a surface that appears to be part of a side of a mountain. There are many types of three-dimensional meshes. One example type of three-dimensional mesh is a triangular mesh. In a triangular mesh, all constituent segments of the mesh are triangles; the vertices of the mesh are connected to create triangles. Any suitable type of three-dimensional mesh can be used.

Maps can also be used to denote areas of interest (AOIs). Areas of interest can be parks, forested areas, indigenous lands, or any designated area. Areas of interest can also be search or area highlights, congestion zones, or other user-based designations. An area of interest can include multiple features, for example buildings, vegetation, and elevation.

Areas of interest can be made visually distinct from other parts of the map view. Areas of interest can be shaded or have a boundary line around them. When a boundary line is used to denote an area of interest, a tint band can be used to make the boundary line more visually distinct. A tint band can be made visually distinct from the area of interest and any features shown in the area of interest.

A tint band can be an extension of the boundary line or distinct from the boundary line. A tint bant can extend or appear to extend from the boundary line in either direction and can be of any width or thickness. A tint band can be of the same color or a different color from the boundary line. A tint band can use a gradient of color or a gradient of opacity to create the visual distinction.

In some implementations, a tint band can be two-dimensional, especially if the area and/or map using the tint band is two-dimensional. When an electronic map is a three-dimensional map, a three-dimensional tint band can be used.

A three-dimensional tint band can provide visual distinctiveness from multiple perspectives and angles, for example in three dimensions. A three-dimensional tint band can also be implemented on a layer of an electronic map. A three-dimensional tint band can be implemented as a three-dimensional mesh. A three-dimensional tint band can be implemented as a triangular three-dimensional mesh.

In some examples, an electronic map may present significant three-dimensional information such as terrain, building heights, elevation, overpasses, and the like. Three-dimensional tint bands are useful in designating and visually distinguishing areas of interest on a map, for example a national forest, or a user-selected area.

Turning now to a particular example, a user may be using a map application on their cellular phone to view a three-dimensional electronic map. As the user is looking around on the map, they may see a national forest which is visually denoted as an area of interest. The national forest can include terrain features such as a valley along one side of the national forest and then mountains along several other sides of the national forest. The national forest can be designated by an overlay which is also three-dimensional and adapts to the terrain underneath the overlay. A two-dimensional polygon representing the boundary of the area of interest, or national forest in this example, can be generated for the overlay. In particular, the overlay can use a tint band to visually distinguish the national forest from the surrounding area. The tint band can be created by using the two-dimensional polygon to create an offset polygon, where the two-dimensional polygon serves as an outside boundary while the offset polygon serves as an inside boundary for a tint band.

The tint band itself can be three-dimensional and can adapt to the terrain underneath it as well. The tint band is two-dimensional, but then is overlayed onto a three-dimensional mesh to create a three-dimensional tint band. The tint band can present itself along the valley on one side of the national forest and along the mountains on the several other sides of the national forest, adapting to the particular terrain it overlays. The tint band can be overlayed onto terrain mesh to create a three-dimensional tint band for that particular resolution of terrain.

In another example, while using the map, the user may zoom out such that the national forest becomes significantly smaller on the map view. The overlay and the tint band can adapt to the new size of the national forest, still within an area of interest. The tint band can adjust its width to be smaller such that the entire area of interest does not become a tint band. The three-dimensional tint band can retain medial axis information from the two-dimensional polygon that represented the original border. The three-dimensional tint band can also retain distance information for each vertex of the three-dimensional tint band in relation to the two-dimensional polygon. The medial axis information and the distance information are examples of information that can be stored in the three-dimensional tint band to allow for dynamic adjustment of the three-dimensional tint band.

In yet another example, the user may have zoomed out enough that the national forest terrain is significantly less detailed on the map view such that the valley on one side of the national forest is not readily apparent. The tint band may also change its three-dimensional appearance because the terrain no longer reflects the valley of the national forest. The tint band can adjust by adapting to the new three-dimensional representation of the terrain of the national forest, overlaying the three-dimensional tint band onto new underlying three-dimensional features. The three-dimensional tint band can be overlayed onto the new terrain to create a new three-dimensional tint band.

FIG. 1 is a diagram illustrating an example map view 100. Map view 100 is from a bird's eye view. Map view 100 can be an electronic map view. Area of interest 102 is designated by a boundary 104, while other features (for example, some buildings, roads, and shrubbery) are not designated. A tint band can be applied to the boundary 104 in order to increase visual distinctiveness.

FIG. 2 is a block diagram of an example system 200 for generating maps based on map data obtained from different sources. For example, system 200 can be configured to obtain map data from different sources (for example, map data vendors), stitch the map data from the different sources together, and generate a map that represents the map data received from the various sources. When stitching together the map data system 200 can make adjustments to the map data to avoid errors, discrepancies, and map appearance problems, as described in detail below.

In some implementations, system 200 can include user device 202. For example, user device 202 can be a computing device such as a laptop computer, desktop computer, smartphone, wearable device (for example, smartwatch, smart glasses, etc.), an in-vehicle infotainment system, and/or other computing device. User device 202 can include a built-in display and/or may be connected to an external display (for example, television, computer monitor, in-car system, smart glasses, etc.) using a wired and/or wireless connection. User device 202 can present graphical user interfaces generated by various software components (for example, operating system, user-level applications, etc.) installed and/or running on user device 202 on the built-in display and/or the connected external display.

In some implementations, user device 202 can include a map engine 204. The map engine 204 can enable client applications 206 on the user device 202 to access the map data received through the map data system 200. The map engine 204 can also process map-related data, for example as provided by a map vendor 242, 252 or a map server 222. In some implementations, client applications 206 can obtain map data from a map server to present the various types of maps and/or map data. Client applications 206 can then process the map data received from the map server to generate the graphical user interfaces presented on the display of user device 202. For example, client applications 206 can obtain the map data from map server 222 running on server device 220 through network 230 (for example, a local area network, wide area network, wireless network, cellular data network, the Internet, etc.).

In some implementations, the user device may have client applications 206 that access map data through the map engine 204. For example, a navigation application for providing directions can be one of the client applications 206. Client applications 206 can generate and/or present graphical user interfaces for presenting map data on a display (for example, built-in, external, etc.) of user device 202. Client applications 206 can present various types of maps that represent various types of map data. For example, client applications 206 can present maps that represent elevation, vegetation, coastlines, landcover, precipitation, and/or other data, as may be described herein. An example client application could be a navigation application. A navigation application can provide graphical user interfaces that allow the user to specify route parameters (for example, start location, destination location, transportation mode, etc.) and request navigation instructions based on the specified route parameters. A navigation application can present recommended routes based on the user specified route parameters and present navigation instructions for a route selected by the user.

In some implementations, system 200 can include server device 220. For example, server device 220 can be a computing device configured to host map server 222. Map server 222 can be a software server, or collection of software servers, configured to generate map data, maps, routing data, and/or routes for client devices (for example, user device 202) and/or client applications 206.

In some implementations, map server 222 can obtain map data from various map data vendors. For example, different map data vendors may specialize in different types of map data. For example, various, different map vendors may specialize in and/or provide high quality terrain elevation data, marine elevation data, climate data, land cover data, etc. Thus, map server 222 may obtain different types of map data from different sources or vendors. Map server 222 can combine the different types of map data received from different map vendors into a combined map data that can be served to client apps 206 or map engine 204 on user device 202.

In some implementations, system 200 can include server device 240 and/or server device 250. For example, server device 240/250 can be a computing device connected to network 230. Server device 240, 250 be configured to communicate with server device 220 through network 230 to deliver vendor map data to server device 220. For example, server device 240/250 can include map vendor servers 242/252 (for example, software servers) that process vendor map data and serve the vendor map data to map server 222 on server device 220. Map vendor 252 can, for example, manage and serve terrain elevation map data to map server 222, while map vendor 242 may manage and serve land cover data (for example, vegetation, forest, urban shrubland, etc.) to map server 222. Map vendor 242 can be associated with a different type of vendor map data than map vendor 252. Map vendor 242 can be associated with the same type of vendor map data as map vendor 252. Map vendor 242/252 can manage and serve any type of map data, including the various types of map data as may be described herein.

FIG. 3 illustrates an example process 300 for generating and/or applying a three-dimensional tint band mesh. For example, process 300 can be performed by the map server 222 or can be performed by the map engine 204 on the user device 202. Alternatively, process 300 could be performed in part by the map server 222 and performed in part by the map engine 204 on the user device 202. Process 300 provides a high-level overview of how a three-dimensional tint band mesh is generated and/or applied to a map. Below process 300 can be described as being performed on the map server 222, but as described above the map engine 204 on the user device 202 can perform all or parts of process 300 as well.

Process 300 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some implementations, the map server 222 will determine the shape of the area of interest polygon at block 302 to generate a polygon 340. The map server 222 may have direct access to the shape of the area of interest, or the map server may receive the shape of the area of interest from elsewhere. For example, the map server 222 may receive the shape of an area of interest from a map vendor 242 or from a selection by a user of the map engine 204 on the user device 202. Polygon 340 will then be processed into a two-dimensional polygon 342. For example, the two-dimensional polygon 342 can be a square with seemingly rounded corners. The two-dimensional polygon 342 will be determined according to the boundary of the AOI and may be a simple shape such as a square, triangle, or rectangle, but it may also be a many sided polygon that has sides with varying lengths. Additionally, the two-dimensional polygon 342 can include multiple short segments which may appear to look like bends and curves at a distance, for example to form a square with seemingly rounded corners.

The two-dimensional polygon 342 will then be processed by the map server 222 to generate an offset polygon 344 at block 304. For example, the map server 222 may buffer and crop the two-dimensional polygon 342 to create the offset polygon 344. The offset polygon 344 is generated such that the offset polygon 344 can be wholly enclosed within the two-dimensional polygon 342 or the offset polygon 344 can wholly enclose the two-dimensional polygon 342. The offset polygon 344 and the two-dimensional polygon 342 are separated by a distance or offset.

In some implementations, the two-dimensional polygon and the offset two-dimensional polygon can be generated with the use of grids, functions, or equations.

The distance or offset represents the difference between any point on the offset polygon 344 to a point on the two-dimensional polygon 342. The distance between the two-dimensional polygon 342 and the offset polygon 344 can be a signed distance measured in units of the three-dimensional map, pixels on a screen, virtual pixels, or any other unit of measurement for graphics. Alternatively, the signed distance can be representative of a physical distance such as centimeters, meters, kilometers, inches, feet, yards, or miles.

In some implementations, the signed distance can be generated based on the use of grids, functions, or equations such that the signed distance for use with a grid, function, or equation manifests in a compatible way.

The sign of the signed distance can be indicative of whether the offset polygon 344 is fully enclosed within the two-dimensional polygon 342 or whether the two-dimensional polygon 342 is fully enclosed within the offset polygon 344. For example, a positive distance may be indicative that the offset polygon 344 is outside the two-dimensional polygon 342, fully enclosing it. In some implementations, the offset polygon 344 can be a smaller or larger version of the two-dimensional polygon 342. In some implementations, the offset polygon 344 may be significantly different than the two-dimensional polygon 342. For example, the two-dimensional polygon 342 may have a peninsula-like feature because the two portions of the outline of the two-dimensional polygon 342 are near each other, for example parallel or nearly parallel. The offset polygon 344 may not have this peninsula-like feature because the signed distance would encompass the entire region The two-dimensional polygon 342 and the offset polygon 344 is then used to generate a two-dimensional tint band 345 at block 306. The two-dimensional polygon 342 can be a first boundary of the two-dimensional tint band 345 and the offset polygon 344 can be a second boundary of the two-dimensional tint band 345. The distance between the two-dimensional polygon 342 and the offset polygon 344 can be referred to as the width or thickness of the two-dimensional tint band 345. In some implementations, the two-dimensional tint band 345 can be a two-dimensional polygon. In some implementations, the two-dimensional tint band 345 can be a two-dimensional mesh. The two-dimensional tint band 345 can be a triangular two-dimensional mesh.

Styling for the two-dimensional tint band 345 can be applied to determine color, opacity, and the transition from one boundary to the other boundary. The transition from one boundary to the other boundary can be a gradient of one or more colors or opacity, or any other visual distinction.

The two-dimensional tint band 345 is then overlayed onto a three-dimensional mesh 346 to create a three-dimensional tint band mesh 348 at block 308. The three-dimensional mesh 346 can be any kind of three-dimensional mesh. For example, the two-dimensional tint band 345 can be overlayed onto a terrain mesh which simulates terrain of a portion of a map. The three-dimensional mesh 346 to be used for block 308 can be chosen to maximize quality, performance, detail, or speed based on the needs of the map server 222 or map engine 204.

When a two-dimensional tint band 345 is overlayed onto a three-dimensional mesh 346 to create a three-dimensional tint band mesh 348, characteristics of and information relating to the two-dimensional polygon 342, the offset polygon 344, and the two-dimensional tint band 345 can be included with the information regarding the three-dimensional tint band mesh 348. For example, the medial axis data for the two-dimensional polygon 342 and/or the signed distance between the two-dimensional polygon 342 and the offset polygon 344 may be preserved with the three-dimensional tint band mesh 348 for future use. Alternatively, a distance field can be generated which contains signed distance values for each vertex of the three-dimensional tint band mesh 435 in relation to the two-dimensional polygon 342.

In some implementations, the signed distance can be used to further refine the three-dimensional tint band mesh. During the process of overlaying the two-dimensional tint band 345 onto the three-dimensional mesh 346, the signed distance between the boundaries of the three-dimensional tint band mesh 348 may deviate from the signed distance between the boundaries of the two-dimensional tint band 345. The map server 222 can use the signed distance to refine the boundaries of the three-dimensional tint band mesh 348 to properly represent the signed distance between the boundaries of the two-dimensional tint band 345. In some implementations, the map server will adjust the boundary of the three-dimensional tint band mesh 348 that was associated with the offset polygon 344 to properly represent the signed distance between the two boundaries of the two-dimensional tint band 345.

In some implementations, the distance field can be used to further refine the three-dimensional tint band mesh. During the process of overlaying the two-dimensional tint band 345 onto the three-dimensional mesh 346, the vertices of the three-dimensional tint band mesh 348 may need to be refined or calculated. The distance field can store the signed distance for each vertex of the three-dimensional tint band 345 in relation to the two-dimensional polygon 342. The map server 222 can use the distance field and the signed distances associated with each vertex of the three-dimensional tint band 345 to refine the boundaries of the three-dimensional tint band mesh 348. In some implementations, the map server will adjust the vertices of the three-dimensional tint band mesh 348 to properly represent the signed distance values for each vertex of the three-dimensional tint band mesh 435 in relation to the two-dimensional polygon 342.

In some implementations, the refinement described above is part of overlaying the two-dimensional tint band 345 onto the three-dimensional mesh 346 to create the three-dimensional tint band mesh 348 at block 308. In some implementations, the medial axis data for the two-dimensional polygon 342 can be used for the refinement described above.

In some implementations, the three-dimensional mesh 346 used to create a three-dimensional tint band mesh 348 can have a lower resolution or fewer collisions than the target three-dimensional mesh. A lower resolution three-dimensional mesh can be considered a foundation mesh in some instances. For example, a three-dimensional mesh of a mountain range may have many peaks, slopes, and valleys. The map server 222 may have multiple terrain meshes for that mountain range with varying levels of resolution and/or collisions. The two-dimensional tint band 345 may be overlayed onto a three-dimensional mesh 346 that does not have resolution for every individual peak, slope, and valley, such as, for example, a foundation mesh. Instead, the lower resolution three-dimensional mesh 346 may have mesh segments connecting peaks rather than providing resolution for every slope. A map server 222 may generate this lower-resolution three-dimensional tint band mesh 348 and send it to a user device 202 for use by the map engine 204. Using a lower-resolution three-dimensional tint band mesh 348 can save bandwidth, memory, and computational power. Additionally, using a lower-resolution three-dimensional tint band mesh 348 may be optimal for viewing by reducing the presence of perturbations or undesirable crinkles in the three-dimensional tint band mesh 348. A three-dimensional tint band mesh 348 with too much resolution may be visually jarring or overly distinct, based at least in part on the presence of perturbations or undesirable crinkles, or otherwise undesirable for visual distinction.

In some implementations, the three-dimensional tint band mesh 348 can be automatically generated when a map view (for example, map view 100 of FIG. 1) is shown. For example, when a user opens a client app 206 that uses the map engine 204, one or more three-dimensional tint band meshes can be generated and automatically applied to an area of interest while or soon after the map view is opened. In some implementations, three-dimensional tint band mesh 348 can be applied to an area of interest in response to an indication. An indication can be any kind of interaction through a user interface of a device running the app using the map view. For example, a user can enter a search query for a particular location on the map and then search for that location. If the location is more properly designated as an area of interest, a three-dimensional tint band mesh 348 can be generated and applied to the area of interest corresponding to the search query. Another example can be a user selecting a location that is more properly designated as an area of interest such as a park, parking lot, national forest, lake, mountain range, entrances, exits, and the like. In these examples, a three-dimensional tint band mesh 348 can be applied to the selected area of interest or to the searched area of interest.

In some implementations, a three-dimensional tint band mesh 348 can already be generated by either a user device (for example, the user device 202 of FIG. 2) or by a sever device (for example, the server devices 220, 240, 250 of FIG. 2) prior receiving a request to display the three-dimensional tint band mesh 348. For example, the map engine 204 can generate a three-dimensional tint band mesh 348 prior to any request to display the three-dimensional tint band mesh 348 and assign the three-dimensional tint band mesh 348 a tint band mesh identifier ("tint band mesh ID"). In this case, the three-dimensional tint band mesh 348 is generated but not displayed. Then when a client app 206 using the map engine 204 requests the three-dimensional tint band mesh 348, the request can include a tint band mesh ID. In such cases, the three-dimensional tint band mesh 348 can be retrieved by determining a tint band mesh ID and then requesting the dimensional tint band mesh 348 via the tint band mesh ID. For example, a client app 206 that uses the map engine 204, requests a tint band mesh for an area of interest. If the area of interest has a tint band mesh ID, the client app 206 can request the three-dimensional tint band mesh 348 from the map engine 204 using the tint band mesh ID. Three-dimensional tint band meshes 348 can be pre-generated when the map engine 204 receives new tiles from the server devices 220, 240, 250 for potential areas of interest. Similarly, three-dimensional tint band meshes 348 can be pre-generated by the server devices after receiving a request for new tiles from the map engine 204 and then send the three-dimensional tint band meshes 348 to the map engine 204. Tiles represent portions of a map that can be requested by a client app 206 or map engine 204 from a server device 220, 240, 250 for presentation of a portion of the map. Tiles can be representative of a 10 mile by 10 mile area map. Tiles can be representative of any size area of a map. For example, a person may be viewing a map of the greater Seattle area that is comprised of a particular number of tiles and/or portions of tiles. As a person zooms in and zooms out, the number of tiles and/or portions of tiles presented on the screen changes because tiles can be associated with a particularly defined geographic region of set size.

FIG. 4 illustrates a flow chart showing an example process 400 for generating a three-dimensional tint band mesh, according to at least one example. The process 400 may be performed by the user device 202 or by the map server 222. In particular, the process 400 may be performed by the map engine 204 of the user device 202. The process 400 may be performed by the map engine 204 of the user device 202 in response to requests from client apps 206 for the generation of a three-dimensional tint band mesh. Alternatively, process 400 could be performed in part by the map server 222 and performed in part by the map engine 204 on the user device 202. Below, process 400 can be described as being performed on the map server 222, but as described above the map engine 204 on the user device 202 can perform all or parts of process 400 as well.

Process 400 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

The process 400 begins at block 402 by receiving a two-dimensional polygon from a server. The two-dimensional polygon can be associated with a geographic area on a map. In some examples, the two-dimensional polygon can be associated with an area of interest on a map.

In some examples, the process 400 may further include the map server 222 generating medial axis information associated with the two-dimensional polygon. Medial axis information can include information regarding an axis comprised of points which are equally close to two points on the associated polygon.

At block 404, process 400 includes generating an offset two-dimensional polygon. The offset two-dimensional polygon can be based at least in part on the two-dimensional polygon. The offset two-dimensional polygon can be the same polygon as the two-dimensional polygon, but larger or smaller. Alternatively, the offset two-dimensional polygon can be a different polygon than the two-dimensional polygon.

The two-dimensional polygon and the offset two-dimensional polygon can correspond, respectively, to a first boundary and a second boundary of a two-dimensional tint band user interface element. Alternatively, the two-dimensional polygon and the offset two-dimensional polygon can correspond, respectively, to a first boundary and a second boundary of a two-dimensional tint band.

In some examples, the offset two-dimensional polygon can be enclosed within the two-dimensional polygon, the offset two-dimensional polygon forming an inner boundary of the two-dimensional tint band user interface element. Alternatively, the two-dimensional polygon can be enclosed within the offset two-dimensional polygon, the offset two-dimensional polygon forming an outer boundary of the two-dimensional tint band user interface element.

At block 406, process 400 includes generating a three-dimensional tint band mesh by overlaying the two-dimensional tint band user interface element onto a three-dimensional mesh corresponding to the map.

In some examples, the three-dimensional mesh corresponding to the map can be corresponding to a portion of the map. In some examples, the three-dimensional mesh corresponds to a terrain on the map. The three-dimensional mesh can also correspond to other three-dimensional meshes used in displaying a three-dimensional map.

In some examples, the three-dimensional mesh corresponding to the map can be a lower resolution or lower collision version of a three-dimensional mesh of the map. For example, the map may use a higher resolution or higher collision version of the mesh whereas process 400 may generate a three-dimensional tint band mesh by overlaying onto a lower resolution version of a three-dimensional mesh associated with the map.

In some examples, the process 400 can further comprise associating the medial axis information with the three-dimensional tint band mesh.

In some examples, the process 400 can further comprise adjusting a width of the three-dimensional tint band mesh. In some examples, the process 400 can further comprise adjusting the three-dimensional tint band mesh when zooming on the map. For example, the user device may receive an indication/request (for example, from a user, a client app, the user device, or from the map server) to zoom in or out on the map. Each request may correspond to a respective zoom level of a set of zoom levels, and each request may include a final zoom level, where the map ends the zoom function and lands on a particular map perspective.

In some examples, the process 400 can further comprise generating a two-dimensional tint band user interface element or a two-dimensional tint band from the two-dimensional polygon and the offset two-dimensional polygon.

In some examples, the process 400 can further comprise refining the three-dimensional tint band. The refining of the three-dimensional tint band can be based at least in part on the two-dimensional polygon, for example the medial axis information associated with the two-dimensional polygon.

In some examples, the process 400 can further comprise refining each vertex in the three-dimensional tint band mesh. The refining of each vertex can be based at least in part on medial axis information associated with the two-dimensional polygon. The refining of each vertex can be based at least in part on a signed distance of each vertex in relation to the two-dimensional polygon.

FIG. 5 illustrates an example process 500 for generating a three-dimensional tint band mesh with medial axis information. Blocks 302, 304, 306, and 308 are described above with relation to FIG. 3. Process 500 includes additional processing and information that can be used for dynamically adjusting the three-dimensional tint band mesh. Process 500 can be performed by the map server 222 or can be performed by the map engine 204 on the user device 202. Alternatively, process 500 could be performed in part by the map server 222 and performed in part by the map engine 204 on the user device 202. Below process 500 can be described as being performed on the map server 222, but as described above the map engine 204 on the user device 202 can perform all or parts of process 500 as well.

At block 503, the map server 222 can determine the medial axis information for the two-dimensional polygon. In some implementations, the two-dimensional polygon will be analyzed and processed to determine the medial axis information. In some implementations, the two-dimensional polygon may be a common polygon such that the map system 222 has the medial axis information for the two-dimensional polygon readily available in storage or memory, for example in a table.

At block 509, the map server 222 can determine the signed distance. In some implementations, the signed distance is a distance of each vertex in the three-dimensional tint band mesh from the two-dimensional polygon. In some implementations, the signed distance is a distance from the two-dimensional polygon to a boundary of the three-dimensional tint band mesh corresponding to the offset two-dimensional polygon. In some implementations, the signed distance corresponds to width of the three-dimensional tint band mesh. The signed distance can then be used as a distance field for dynamic adjustment of the three-dimensional tint band mesh and its vertices. The distance field can be stored with the three-dimensional tint band mesh to enable the dynamic adjustment of the width of the three-dimensional tint band mesh without the need to generate a new three-dimensional tint band mesh. The signed distance and the related distance field enables the dynamic adjustment of the three-dimensional tint band mesh by allowing interpolation of both the boundaries of the tint band mesh and the tint band width. As the signed distance is dynamically changed, the boundary of the three-dimensional tint band mesh corresponding to the offset two-dimensional polygon is adjusted is changed to reflect the signed distance. In at least some implementations, the medial axis information of the two-dimensional polygon is used in conjunction with the new signed distance to create the new boundary of the three-dimensional tint band mesh.

The signed distance in conjunction with the medial axis information allows for a single three-dimensional tint band mesh to support multiple tint band widths. The same three-dimensional tint band mesh may be presented differently, for example with different widths, under different factors. For example, the three-dimensional tint band mesh may be presented on multiple displays, multiple devices, or under multiple configurations settings. When displaying the three-dimensional tint band, the different factors can be used to determine an appropriate tint band width of a three-dimensional tint band which can be adjusted through the use of the signed distance and medial axis information.

At block 510, the medial axis information of the two-dimensional polygon can be included, associated, and/or stored with the three-dimensional tint band mesh for future use. The distance field having the signed distance of each vertex in the three-dimensional tint band mesh from the two-dimensional polygon can also be included, associated, and/or stored with the three-dimensional tint band mesh for future use. The medial axis information can be a set of all points having more than one closest point on the two-dimensional polygon's boundary.

Figure 6:
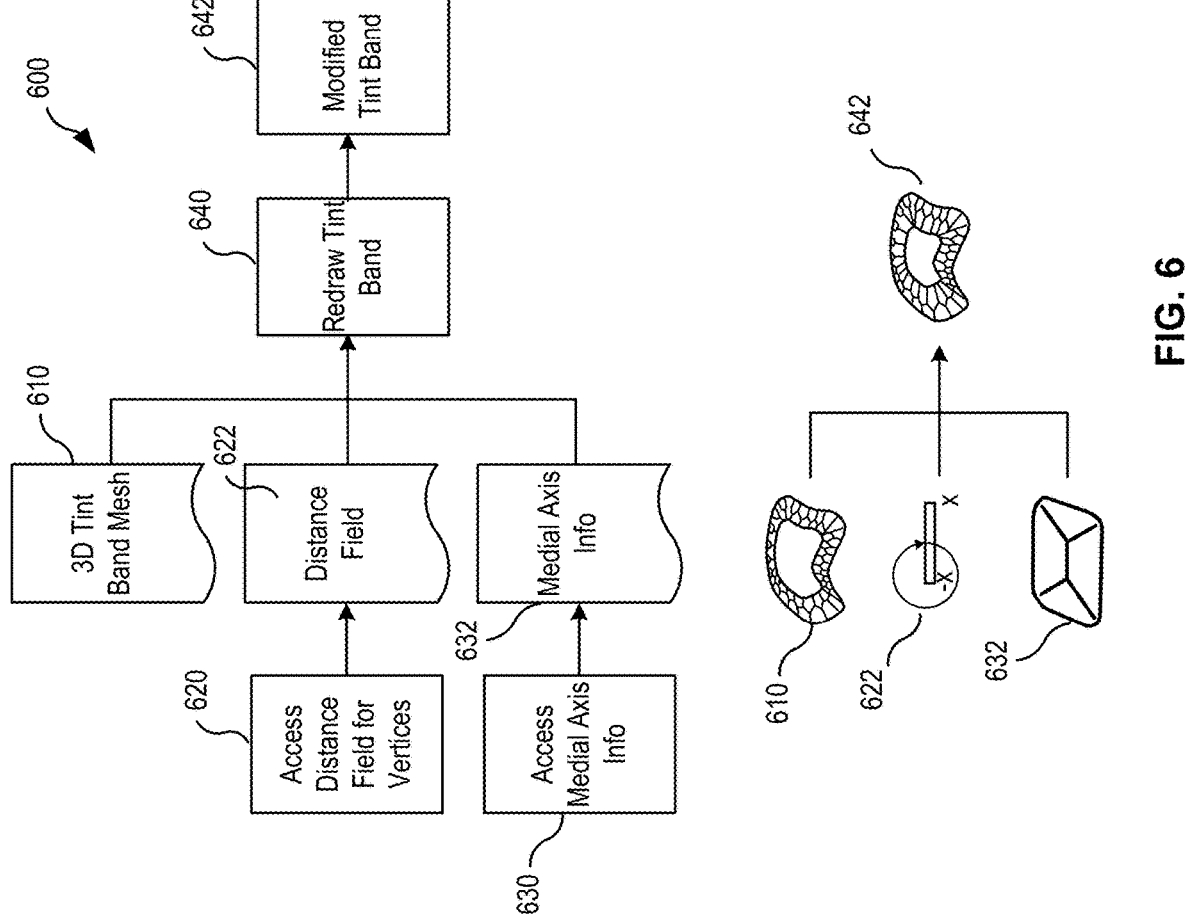
FIG. 6 illustrates a block diagram for performing the techniques described herein, according to an embodiment of the present disclosure.

FIG. 6 illustrates an example process 600 for modifying a three-dimensional tint band mesh by using the medial axis information. As a map view changes, the three-dimensional tint band mesh can adapt. For example, the user may zoom in or zoom out of a map view. As the map changes, respective zoom levels can be generated and presented. The use of zoom may cause the present dimensions of the three-dimensional tint band mesh to be too large or too small, for example the three-dimensional tint band mesh may be too thick. Alternatively, it may be advantageous to change the width of the three-dimensional tint band mesh dynamically in response to inputs, for example for additional emphasis on the area of interest when selected or when the area of interest is selectable. The medial axis information can be used in the modification of the three-dimensional tint band mesh by describing how vertices and/or edges of the three-dimensional tint band mesh can be uniformly adjusted and/or moved to maintain the shape of the inner and outer boundaries of the three-dimensional tint band mesh as much as possible. Similarly, the medial axis information can be used to describe how vertices and/or edges of the two-dimensional tint band and/or two-dimensional polygon can be uniformly adjusted and/or moved to maintain, respectively, the shape of the inner and outer boundaries of the two-dimensional tint band and/or two-dimensional polygon. Using the medial axis information to adjust and/or move the vertices and/or edges of the two-dimensional tint band and/or the two-dimensional polygon can be used to calculate how the vertices and/or edges of the three-dimensional tint band mesh can be uniformly adjusted and/or moved to maintain the shape of the inner and outer boundaries of the three-dimensional tint band mesh as much as possible. In some implementations, the medial axis information describes a medial axis that should maintain roughly the same shape as the width of the three-dimensional tint band mesh, two-dimensional tint band, and/or two-dimensional polygon changes.

At block 620, the map server 222 accesses the distance field 622 for the vertices of the three-dimensional tint band mesh 348. The distance field 622 can be altered to provide the interpolation intervals for redrawing the three-dimensional tint band mesh. As described above, the signed distance field for the boundary of the three-dimensional tint band mesh 348 can be included with the three-dimensional tint band mesh 348.

At block 630, the map server 222 accesses the medial axis information 632 of the two-dimensional polygon 342 used to generate the three-dimensional tint band mesh 348. The medial axis information 632 can be used to refine, verify, or calculate the signed distance of each vertex in the three-dimensional tint band mesh from the two-dimensional polygon. The medial axis information 632 can also be used to refine, verify, or calculate the signed distance of each vertex in the modified three-dimensional tint band mesh from the two-dimensional polygon once the tint band is redrawn. As described above, the medial axis information, and other characteristics of the two-dimensional polygon, can be included with the three-dimensional tint band mesh 348.

At block 640, the map server 222 redraws the three-dimensional tint band mesh based at least in part on one or more of the following: the three-dimensional tint band mesh 610, the distance field 622, and the medial axis information 632. For example, the medial axis information 632 can be used in conjunction with the updated distance field to alter the width of the three-dimensional tint band mesh.

In some implementations, the medial axis information is used to match the discrete signed distance field to an exact signed distance field in the three-dimensional mesh. This allows the width of the tint band mesh to be dynamically altered.

FIG. 7 illustrates an example process 700 for adjusting a three-dimensional tint band mesh. For example, the width of the tint band mesh can be adjusted, or the size of the tint band mesh can be adjusted. Process 700 can be performed by the map server 222 or can be performed by the map engine 204 on the user device 202. Alternatively, process 500 could be performed in part by the map server 222 and performed in part by the map engine 204 on the user device 202. Below process 700 may be described as being performed on the map server 222, but as described above the map engine 204 on the user device 202 can perform all or parts of process 700 as well.

Process 700 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 702, the process 700 includes receiving an indication to update a first boundary of a three-dimensional tint band overlayed on a three-dimensional mesh corresponding to a map. The first boundary can comprise of connected vertices.

In some examples, the indication can be from a user. The indication can also be from a client app 206 or the map engine 204, or from the user device 202. The indication can also be from a map server 222 or a map vendor 242, 252.

In some examples, the indication can be based at least in part on a user or a user device zooming in on a map. The indication can also be a request to adjust the width of the three-dimensional tint band.

At block 704, the process 700 includes accessing medial axis information associated with a second boundary of the three-dimensional tint band.

In some examples, the medial axis information is generated from the two-dimensional polygon from which the three-dimensional tint band was generated. The two-dimensional polygon can be associated with the second boundary of the two-dimensional tint band. The two-dimensional polygon can represent a boundary for an area of interest on a map.

At block 706, the process 700 includes, in accordance with receiving the indication, determining a corresponding signed distance for each vertex of the vertices of the first boundary and the second boundary based at least in part on the medial axis data.

In some examples, the signed distance corresponding to each vertex of the first boundary is based at least in part on a distance field. The distance field can have values for each vertex of the first boundary. The distance field can be associated with the two-dimensional polygon from which the three-dimensional tint band was generated. The values of the distance fields can be a distance in relation to the two-dimensional polygon from which the three-dimensional tint bant was generated.

At block 708, the process 700 includes redrawing the first boundary on the three-dimensional tint band, each vertex of the vertices of the first boundary configured to be the corresponding signed distance away from the second boundary.

In some examples, the first boundary can be enclosed by the second boundary. In some examples, redrawing the first boundary includes redrawing the first boundary outside the second boundary.

Alternatively, the second boundary can be enclosed by the first boundary. In some examples, redrawing the first boundary includes redrawing the first boundary inside the second boundary.

FIGS. 8A, 8B, and 8C illustrate an example method for overlaying of a two-dimensional tint band (for example, the two-dimensional tint band 345 of FIG. 3) onto a three-dimensional mesh (for example, the three-dimensional mesh 346 of FIG. 3) using connectivity information. The two-dimensional tint band can be overlayed (also referred to as draped) onto a three-dimensional mesh. For example, the two-dimensional tint band may be overlayed onto a three-dimensional mesh such as a terrain mesh which stores terrain, elevation, and other information to generate a three-dimensional tint band mesh. As described above, the three-dimensional tint band mesh can be generated for a particular terrain mesh or an associated terrain mesh. In some implementations, when a two-dimensional tint band is overlayed onto a three-dimensional mesh, the overlaying of the two-dimensional tint band onto the three-dimensional mesh can include merging the connectivity information of both the two-dimensional tint band and the three-dimensional mesh. In some implementations, when a two-dimensional tint band is overlayed onto a three-dimensional mesh, the overlaying of the two-dimensional tint band onto the three-dimensional mesh can include sorting the segments of the two-dimensional tint band along an axis of the three-dimensional mesh and then merging the connectivity information of both the two-dimensional tint band and the three-dimensional mesh. In some implementations, the merging of the two-dimensional tint band and the three-dimensional mesh uses spatial data structures to determine how segments in the two-dimensional tint band intersect with the three-dimensional mesh. In some implementations, the connectivity information for a mesh (for example, of the two-dimensional tint band or the three-dimensional mesh) can be a connectivity graph which can be a representation and/or collection of connectivity information for the particular mesh.

In some implementations, the overlaying of the two-dimensional tint band onto a three-dimensional mesh can be used to adapt a two-dimensional tint band generated for a particular zoom level of a terrain mesh to another zoom level. For example, a two-dimensional polygon can be used to represent a congestion zone, but the particular two-dimensional polygon may be only available on a subset of the total set of zoom levels. The two-dimensional tint band can be draped onto a terrain mesh corresponding to a second zoom level, the second zoom level not being the same as the zoom level associated with the two-dimensional tint band. In this situation, the two-dimensional tint band will then be overlayed onto the terrain mesh in order to generate a three-dimensional tint band mesh of the same zoom level as the terrain mesh.

In some implementations, the computing device receives and/or loads the terrain mesh and the two-dimensional tint band at different times, for example asynchronously. For example, a client device can load the terrain mesh separately from the two-dimensional tint band. The two-dimensional tint band in this example may not be at the same zoom level as the terrain mesh which can cause artifacts (for example, the three-dimensional meshes may not overlay correctly and intersect).

In some implementations, the use of connectivity information for the overlaying of a two-dimensional tint band onto a three-dimensional mesh can lead to orders of magnitude increase in performance. For example, overlaying of a two-dimensional tint band onto a three-dimensional mesh by using connectivity information can be approximately a thousand times more performant than typical overlaying of two-dimensional polygon or mesh onto a three-dimensional meshes.

In some implementations, one or both the two-dimensional tint band and the three-dimensional mesh can have built-in connectivity information. Connectivity information for three-dimensional meshes, two-dimensional meshes, and two-dimensional polygons can be stored in many different forms. Connectivity information can include that each vertex of the three-dimensional mesh, two-dimensional mesh, or two-dimensional polygon stores information regarding which segments are formed using that particular vertex. Connectivity information can include that each edge of the three-dimensional mesh, two-dimensional mesh, or two-dimensional polygon stores information regarding which segments are formed using that particular edge. Connectivity information can include that each segment of the three-dimensional mesh, two-dimensional mesh, or two-dimensional polygon stores information regarding which segments are neighboring that particular segment. Connectivity information can include any combination of the above.

FIG. 8A represents an example portion of a two-dimensional tint band 810. In particular, FIG. 8A depicts a two-dimensional tint band 810 made up of triangular segments, or a triangular mesh. However, other types of two-dimensional meshes can be used. Vertex 812 is a vertex in the two-dimensional tint band 810, and is a part of a first segment 814 and second segment 816. Vertex 812 may be a vertex in other segments of the two-dimensional tint band mesh not pictured in this example.

FIG. 8B represents an example portion of a three-dimensional mesh 820 on which the two-dimensional tint band 810 of FIG. 8A can be draped. For example, three-dimensional mesh 820 can be a terrain mesh. Three-dimensional mesh 820 can also be any other three-dimensional mesh on which the two-dimensional tint band 810 can be draped. Third segment 822 is an example segment of the three-dimensional mesh 820.

FIG. 8C can be used to describe an example process 830 of overlaying of the two-dimensional tint band 810 onto the three-dimensional mesh 820 using the connectivity information of the three-dimensional mesh 820. The two-dimensional tint band 810 can be described as a source mesh. The three-dimensional mesh 820 can be described as a target mesh or a foundation mesh. The process 830 begins building a doubly connected edge list (DCEL) of the target mesh. Then any segment of the source mesh can be picked, for example the first segment 814. Then a vertex of the segment of the source mesh can be picked, for example vertex 812 which is a part of the first segment 814. Picking a segment of the source mesh and a particular vertex of that segment can be determined by any means. A segment of the source mesh can be described as a source segment, and a segment of the target mesh can be described as a target segment.

The process 830 then searches the target mesh for a segment which contains the vertex from the segment of the source mesh. For example, as can be seen in FIG. 8C, the vertex 812 of two-dimensional tint band 810 is contained in third segment 822 of the three-dimensional mesh 820. Once the segment of the target mesh containing the vertex is identified, then the segment of the source mesh is clipped against the segment of the target mesh. Clipping can include first moving the source mesh into the dimensionality and axes of the target mesh. For example, if the source mesh is a two-dimensional mesh and the target mesh is a three-dimensional mesh, the source mesh is moved into a three-dimensional space with the axes of the target mesh. The source mesh can be moved into a three-dimensional space by adding a third dimension to all of the vertices and setting the third dimension to a normalized value, for example, zero. Clipping the segment of the source mesh against the segment of the target mesh can also include identifying the portion of the source mesh that overlaps with the segment of the target mesh in some dimensions. For example, if the source mesh is now three-dimensional after being moved into the three-dimension space to match the target mesh, then the overlap will be determined by overlapping in the two dimensions of the source mesh. For example, if the source mesh has x and y dimensions (with a newly added z dimension) while the target mesh has x, y, and z dimensions, then the overlap can be defined in the x and y dimensions. Clipping can also include creating a new segment for the overlapping portion of the source mesh and the target mesh. The new segment can include new vertices where an edge of the segment of the source mesh intersects with an edge of the segment of the target mesh. Clipping can also include updating the newly added dimension to the vertices of the new segment of the source mesh to match the values of the target mesh. In this way, clipping can be configured to enable a source mesh to overlap onto a target mesh. Then for each edge of the segment of the target mesh, breadth first search to the neighboring target segment to determine if the source segment and clip the source segment against the target segment. Thus, the connectivity information of the target mesh is used to overlay the source mesh onto the target mesh.

Once the entire source segment has been identified and clipped against the target segment, the source segment can be marked as processed. Then the process 830 returns to the original vertex and identifies another segment of the source mesh of which the vertex forms. For example, the process 830 may return to vertex 812 to the second segment 816 of the two-dimensional tint band 810 after marking the first segment 814 processed. All segments of which the vertex forms will undergo the process 830 as described above. Then the process 830 will advance to the next vertex in the source mesh and identify any unprocessed segments. This process 830 continues until all segments in the source mesh as marked as processed.

In some implementations, once the source segment is processed, the overlaying progresses through segments neighboring the source segment. For any foundation segments visited that are intersecting the source segment, test the intersection of the foundation segment against an unprocessed neighboring source segment (for example, the neighboring source segment is a neighbor to the source segment already processed). For any foundation segments found intersecting with neighboring segments of the source segment, add the pair of segments to the known set of intersecting pairs. The neighboring source segment can be marked as processed as detailed.

The above process 830 can also be used when the two-dimensional tint band 810 is a two-dimensional polygon rather than a two-dimensional mesh. For the purposes of process 830, a two-dimensional polygon can be treated as a two-dimensional mesh with a single segment. The techniques described above can be used if the two-dimensional tint band 810 is a two-dimensional polygon by treating the two-dimensional tint band as a two-dimensional mesh with a single segment.

In some implementations, one of the meshes is a two-dimensional mesh and the other mesh is a three-dimensional mesh. For example, the source mesh can be a two-dimensional mesh and the target mesh can be a three-dimensional mesh. In some implementations, both of the meshes can be three-dimensional meshes.

The techniques described in relation to FIGS. 8A, 8B, and 8C can also be adapted for use in overlaying one three-dimensional mesh onto another three-dimensional mesh. In some implementations, the overlaying of three-dimensional meshes can be used to adapt three-dimensional tint band meshes generated for a particular zoom level of a terrain mesh to another zoom level. For example, a two-dimensional polygon can be used to represent a congestion zone, but the particular two-dimensional polygon may be only available on a subset of the total set of zoom levels. In such an example, when a three-dimensional tint band mesh is generated from the two-dimensional polygon for a particular zoom level, the three-dimensional tint band mesh will also be adapted for the particular zoom level. However, the three-dimensional tint band mesh may then need to be draped onto a terrain mesh corresponding to a second zoom level, the second zoom level not being the same as the zoom level associated with the three-dimensional tint band mesh. In this situation, the three-dimensional tint band mesh will then be overlayed onto the terrain mesh in order to generate a three-dimensional tint band mesh of the same zoom level as the terrain mesh.

In some implementations, the computing device receives and/or loads the terrain mesh and the three-dimensional tint band mesh at different times, for example asynchronously. For example, a client device can load the terrain mesh separately from the three-dimensional tint band mesh. The three-dimensional tint band mesh in this example may not be at the same zoom level as the terrain mesh which can cause artifacts (for example, the three-dimensional meshes may not overlay correctly and intersect).

In some implementations, the use of connectivity information for the overlaying of three-dimensional meshes can lead to orders of magnitude increase in performance. For example, overlaying of three-dimensional mesh by using connectivity information can be approximately a thousand times more performant than typical overlaying of three-dimensional meshes.

FIG. 9 illustrates an example process 900 for overlaying a two-dimensional mesh onto a three-dimensional mesh. For example, the two-dimensional tint band mesh can be over-layed onto a three-dimensional mesh. In some examples, the two-dimensional tint band mesh can be overlayed onto a terrain mesh corresponding to a map. Process 900 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 902, receiving a three-dimensional mesh, the three-dimensional mesh comprising a first set of segments, the three-dimensional mesh including connectivity information identifying how segments of the first set of segments are connected.

In some examples, the connectivity information can include which segments are comprised of which vertices. The connectivity information can include which segments are comprised of which edges. The connectivity information can include which segments are adjacent to other segments in the three-dimensional mesh. The connectivity information can be stored with the individual vertices, the individual edges, the individual segments, or with the overall three-dimensional mesh.

At block 904, receiving, a two-dimensional mesh, the two-dimensional mesh comprising a second set of segments.

In some examples, the three-dimensional mesh corresponds to a terrain mesh associated with a map. Alternatively, the three-dimensional mesh can be any three-dimensional mesh associated with a map.

In some examples, the two-dimensional mesh corresponds to a tint band mesh associated with an area of interest of a map. In some examples, the two-dimensional mesh can also include connectivity information. The connectivity information can include which segments are comprised of which vertices. The connectivity information can include which segments are comprised of which edges. The connectivity information can include which segments are adjacent to other segments in the three-dimensional mesh. The connectivity information can be stored with the At block 906, overlaying the two-dimensional mesh on the three-dimensional mesh based at least upon the connectivity information of the three-dimensional mesh.

In some examples, overlaying the two-dimensional mesh on the three-dimensional mesh can include identifying a first segment of the two-dimensional mesh. The first segment can comprise a vertex. Overlaying the two-dimensional mesh on the three-dimensional mesh can include identifying a second segment of the three-dimensional mesh containing the vertex. Overlaying the two-dimensional mesh on the three-dimensional mesh can include identifying segments of the three-dimensional mesh intersecting the first segment. The identification of segments can include breadth-first searching of adjacent segments of the three-dimensional mesh based at least in part on the connectivity information. In some examples, the identification of segments can include depth-first searching of adjacent segments of the three-dimensional mesh based at least in part on the connectivity information.

In some examples, overlaying the two-dimensional mesh on the three-dimensional mesh can include clipping the first segments against the segments of the three-dimensional mesh intersecting the first segment.

In some examples, overlaying the two-dimensional mesh on the three-dimensional mesh can include identifying a third segment of the two-dimensional mesh also comprising the vertex. The third segment and the first segment can refer to different segments. Overlaying the two-dimensional mesh on the three-dimensional mesh can include identifying segments of the three-dimensional mesh intersecting the third segment. The identification of segments can include breadth-first searching of adjacent segments of the three-dimensional mesh based at least in part on the connectivity information. In some examples, the identification of segments can include depth-first searching of adjacent segments of the three-dimensional mesh based at least in part on the connectivity information.

In some situations, a flicker effect may be perceived when an old terrain mesh with an overlay is replaced by a new terrain mesh with a corresponding overlay. For example, the new terrain mesh is received by a user device and presented at the user device to replace an old terrain mesh, but an overlay is being used on the old terrain mesh. However, as the new terrain mesh is presented, the corresponding new overlay may not have been fully generated. This can cause a flicker effect where the user sees the old overlay disappear as the new terrain mesh is presented instead of the old terrain mesh and old overlay, and the new overlay appears some perceptible amount of time later. This flicker effect can happen as a user causes a terrain mesh for a portion of the map (for example, a tile) to change, for example by zooming-in or zooming-out. In some implementations, the portion of the map can include a three-dimensional tint band overlay for an area of interest. In some implementations, when the computing device receives the terrain mesh for the portion of the map, the computing device immediately presents the terrain mesh. However, due to the computational requirements for generating a new three-dimensional tint band overlay for an area of interest (or other overlays) on the new terrain mesh, the new three-dimensional tint band overlay may not be ready for display. This can cause a flickering effect while zooming-in or zooming-out as the map tries to generate new three-dimensional tint band overlays for areas of interest on new terrain meshes as the terrain meshes are received and displayed.

The flickering effect can be reduced by use of techniques described herein. A zoom-in or zoom-out can lead to a request for a new terrain mesh for a portion of a map (for example, a tile of the map) to provide the proper level of detail. Upon receipt of the new terrain mesh for a portion of a map, the map engine (for example, the map engine 204 of FIG. 2) can determine if the portion of the map has any pending overlays to apply. The map engine can determine that a portion of the map has pending overlays to apply by determining if a previous terrain mesh for the portion of the map had overlays. In some implementations, the map engine receives data from a server (for example, the server devices 220, 240, 250) regarding overlays to be applied to the portion of the map corresponding to the new terrain mesh. Once the map engine determines that the portion of the map has pending overlays to apply, the map engine determines not to render the new terrain mesh until the pending overlays are completed. Instead, the map engine uses a fallback process. The fallback process identifies terrain meshes with zoom levels closest to the new terrain mesh for the portion of the map in the memory cache associated with the map engine that already have overlays properly generated and draped. The map engine then displays the closest terrain meshes with overlays properly generated and draped for that portion of the map and displays that terrain mesh and associated overlays until the overlays for the new terrain mesh are generated and draped. Then the map engine can display the new terrain mesh and associated overlays.

When determining which terrain meshes are closest to the new terrain mesh, the map engine checks terrain meshes in a particular order of their zoom level (which can be referred to as a fallback process). For example, the map engine first checks the terrain mesh with one zoom level lower than the new terrain mesh (a lower zoom level means that there is less detail indicative of seeing something from farther away). If the terrain mesh with one zoom level lower than the new terrain mesh has been 1) previously received and 2) no overlays are pending, then the terrain mesh with one zoom level lower is adequate for display. If the terrain mesh with one zoom level lower than the new terrain mesh has not been previously received or has overlays pending, then it is inadequate for display as a fallback to reduce the flickering previously described. In some implementations, if the terrain mesh with one zoom level lower is inadequate, the map engine can then check the terrain mesh with two zoom levels lower than the new terrain mesh for adequacy for display, looking at the same conditions as described above in relation to the terrain mesh with one zoom level lower. In some implementations, if the terrain mesh with two zoom levels lower is inadequate, the map engine can check the terrain mesh with one zoom level higher (more detailed as if the terrain mesh is closer and more detail is apparent). In some implementations, if the terrain mesh with one zoom level higher is inadequate, the map engine can check the terrain mesh with three zoom levels lower. In some implementations, if the terrain mesh with three zoom levels lower is inadequate, the map engine can check the terrain mesh with four zoom levels lower. In some implementations, if the terrain mesh with four zoom levels lower is inadequate, the map engine can check the terrain mesh with two zoom levels higher. In some implementations, if the terrain mesh with two zoom levels higher is inadequate, the map engine can check the terrain mesh with five zoom levels lower. In some implementations, if the terrain mesh with five zoom levels lower is inadequate, the map engine can check the terrain mesh with three zoom levels higher.

FIG. 10 illustrates an example process 1000 for fixing a potential flickering when loading portions of maps that have draped overlays as a new overlay is generated and draped onto the new portion of the map. For example, a user may cause a map to zoom-in or zoom-out such that the terrain mesh for a portion of the map (for example, a tile) is going to change. The old terrain mesh for the portion of the map can already have a previously draped overlay which overlay will need to be updated as the new terrain mesh of the portion of the map is presented in response to a user zooming-in and zooming-out. Generating a new overlay for the new terrain mesh can take enough time that the user may perceive a flickering as the new terrain mesh is presented and the new overlay is not also immediately able to be presented to the user. Process 1000 is illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At block 1002, the computing device can receive a first three-dimensional mesh corresponding to a portion of a map. The first three-dimensional mesh can be configured to be presented and to replace the presentation of a corresponding second three-dimensional mesh being used by the computing device. As described herein, the first three-dimensional mesh can be received in response to a request for a new terrain mesh for a portion of a map. In some implementations, the request for a new terrain mesh can be sent in response to a zoom-in or zoom-out on a map of the computing device.

At block 1004, the computing device can generate a first overlay to be draped over the first three-dimensional mesh. The first overlay can correspond to a second overlay draped over the second three-dimensional mesh. For example, the second three-dimensional mesh can be a low detail terrain mesh for a mountain range that is designated as an area of interest and the second three-dimensional mesh can be associated with a second overlay, such as a three-dimensional tint band, draped over the mountain range. The first three-dimensional mesh can be a higher detail terrain mesh for the mountain range (for example, a more zoomed in version of the terrain mesh for the mountain range) and a first overlay can be generated for the higher detail first three-dimensional mesh that corresponds to the second overlay.

At block 1006, the computing device can identify a third three-dimensional mesh to present while the first overlay is being generated. The third three-dimensional mesh can correspond to the first three-dimensional mesh. The third three-dimensional mesh can be associated with a third overlay corresponding to the first overlay. In some implementations, identifying a third three-dimensional mesh to present while the first overlay is being generated is based on a determination that there are overlays pending for the first three-dimensional mesh (such as pending generation and/or draping onto the three-dimensional mesh). The identification of the third three-dimensional mesh can be based on a fallback process described herein.

At block 1008, the computing device can present the third three-dimensional mesh and the third overlay. The third three-dimensional mesh and the third overlay are presented as a stopgap until the first overlay is generated and can be presented simultaneously with the first three-dimensional mesh. The use of the stopgap of the third three-dimensional mesh and third overlay (which are identified via the fallback process described herein) allows the presentation of a best effort approximation of the first three-dimensional mesh and the first overlay until the first overlay is generated.

At block 1010, the computing device can present, in response to the generation of the first overlay, the first three-dimensional mesh and the first overlay. By presenting both the first three-dimensional mesh and the first overlay at approximately the same time, no flicker effect may be noticeable by the user.

Other preferred and non-limiting embodiments or aspects will be set forth in the following numbered clauses:

Clause 1: A computer-implemented method, comprising: receiving, by a computing device, a two-dimensional polygon, the two-dimensional polygon being associated with a geographic area on a map; generating, by the computing device, an offset two-dimensional polygon based at least in part on the two-dimensional polygon, the two-dimensional polygon corresponding to a first boundary of a two-dimensional tint band user interface element and the offset two-dimensional polygon corresponding to a second boundary of the two-dimensional tint band user interface element; and generating, by the computing device, a three-dimensional tint band mesh by overlaying the two-dimensional tint band user interface element on a three-dimensional mesh corresponding to the map.

Clause 2: The method of clause 1, further comprising refining the three-dimensional tint band mesh based at least in part on medial axis information associated with the two-dimensional polygon.

Clause 3: The method of any of clauses 1-2, further comprising refining each vertex of the three-dimensional tint band mesh based at least in part on a signed distance of each vertex in relation to the two-dimensional polygon.

Clause 4: The method of any of clauses 1-3, wherein the three-dimensional mesh corresponding to the map represents terrain.

Clause 5: The method of any of clauses 1-4, further comprising generating signed distance information for each vertex of the three-dimensional tint band mesh in relation to the two-dimensional polygon.

Clause 6: The method of clause 5, further comprising adjusting a width of the three-dimensional tint band mesh based at least in part on the medial axis information.

Clause 7: The method of any of clauses 5-6, further comprising adjusting the three-dimensional tint band mesh when zooming on the map based at least in part on the medial axis information.

Clause 8: The method of any of clauses 1-7, further comprising generating medial axis information associated with the two-dimensional polygon.

Clause 9: The method of clause 8, further comprising associating the medial axis information with the three-dimensional tint band mesh.

Clause 10: The method of any of clauses 1-9, further comprising generating a two-dimensional tint band user interface element.

Clause 11: The method of any of clauses 1-10, wherein the offset two-dimensional polygon is enclosed within the two-dimensional polygon, the offset two-dimensional polygon forming an inner boundary of the two-dimensional tint band user interface element.

Clause 12: The method of any of clauses 1-11, further comprising: receiving, by the computing device, a second three-dimensional mesh corresponding to the map, the second three-dimensional mesh comprising a first set of segments, the second three-dimensional mesh including connectivity information identifying how segments of the first set of segments are connected; and overlaying, by the computing device, the two-dimensional tint band user interface element on the second three-dimensional mesh based at least upon the connectivity information of the second three-dimensional mesh.

Clause 13: The method of clause 12, wherein each segment of the first set of segments comprises vertices; and wherein the connectivity information includes which segments are comprised of which vertices.

Clause 14: The method of any of clauses 12-13, wherein each segment of the first set of segments comprises edges; and wherein the connectivity information includes which segments are comprised of which edges.

Clause 15: One or more non-transitory computer-readable media comprising computer-executable instructions that, when executed by one or more processors, cause the one or more processors to perform the method of any one of clauses 1-14.

Clause 16: A computerized system, comprising: a memory configured to store computer-executable instructions; and one or more processors in communication with the memory and configured to access the memory and execute the computer-executable instructions to perform the method of any one of clauses 1-14.

Clause 17: A computer-implemented method, comprising: receiving, by a computing device, an indication to update a first boundary of a three-dimensional tint band overlayed on a three-dimensional mesh corresponding to a map, the first boundary comprising connected vertices; accessing, by the computing device, medial axis information associated with a second boundary of the three-dimensional tint band; in accordance with receiving the indication, determining, by the computing device, a corresponding signed distance for each vertex of the vertices of the first boundary and the second boundary based at least in part on the medial axis data; and redrawing, by the computing device, the first boundary on the three-dimensional tint band, each vertex of the vertices of the first boundary configured to be the corresponding signed distance away from the second boundary.

Clause 18: The method of clause 17, wherein the indication is based at least in part on a request to update a zoom level of the map.

Clause 19: The method of any of clauses 17-18, wherein the indication is based at least in part on adjusting a width of the three-dimensional tint band.

Clause 20: The method of any of clauses 17-19, wherein the corresponding signed distance for each vertex of the vertices of the first boundary is based at least in part on a distance field comprising values for each vertex of the vertices of the first boundary.

Clause 21: The method of clause 20, wherein the distance field is associated with a two-dimensional polygon from which the three-dimensional tint band was generated.

Clause 22: The method of any of clauses 17-21, wherein the second boundary is associated with a two-dimensional polygon from which the three-dimensional tint band was generated.

Clause 23: The method of clause 22, wherein the medial axis information is generated from the two-dimensional polygon from which the three-dimensional tint band was generated.

Clause 24: The method of any of clauses 22-23, wherein the medial axis information is based at least in part on a two-dimensional polygon corresponding to the second boundary of the three-dimensional tint band, the two-dimensional polygon representing a boundary for an area of interest on a map.

Clause 25: The method of any of clauses 17-24, wherein the first boundary is enclosed within the second boundary.

Clause 26: The method of clause 25, wherein redrawing the first boundary includes redrawing the first boundary outside the second boundary.

Clause 27: One or more non-transitory computer-readable media comprising computer-executable instructions that, when executed by one or more processors, cause the one or more processors to perform the method of any one of clauses 17-26.

Clause 28: A computerized system, comprising: a memory configured to store computer-executable instructions; and one or more processors in communication with the memory and configured to access the memory and execute the computer-executable instructions to perform the method of any one of clauses 17-26.

Clause 29: A computer-implemented method, comprising: receiving, by the computing device, a three-dimensional mesh, the three-dimensional mesh comprising a first set of segments, the three-dimensional mesh including connectivity information identifying how segments of the first set of segments are connected; receiving, by the computing device, a two-dimensional mesh, the two-dimensional mesh comprising a second set of segments; and overlaying, by the computing device, the two-dimensional mesh on the three-dimensional mesh based at least upon the connectivity information of the three-dimensional mesh.

Clause 30: The method of clause 29, wherein each segment of the first set of segments comprises vertices; and wherein the connectivity information includes which segments are comprised of which vertices.

Clause 31: The method of any of clauses 29-30, wherein each segment of the first set of segments comprises edges; and wherein the connectivity information includes which segments are comprised of which edges.

Clause 32: The method of any of clauses 29-31, wherein the connectivity information includes which segments of the first set of segments are adjacent to which other segments of the first set of segments.

Clause 33: The method of any of clauses 29-32, wherein the three-dimensional mesh corresponds to a terrain mesh associated with a map.

Clause 34: The method of any of clauses 29-33, wherein the two-dimensional mesh corresponds to a tint band mesh associated with an area of interest of a map.

Clause 35: The method of any of clauses 29-34, wherein the two-dimensional mesh includes second connectivity information identifying how segments of the second set of segments are connected.

Clause 36: The method of any of clauses 29-35, wherein overlaying the two-dimensional mesh on the three-dimensional mesh includes: identifying a first segment of the two-dimensional mesh, the first segment comprising a vertex; identifying a second segment containing the vertex, the second segment corresponding to the three-dimensional mesh; identifying segments of the three-dimensional mesh intersecting the first segment, by breadth-first searching adjacent segments of the three-dimensional mesh based at least in part on the connectivity information, beginning with the adjacent segments of the second segment.

Clause 37: The method of clause 36, wherein overlaying the two-dimensional mesh on the three-dimensional mesh further includes: clipping the first segment against the segments of the three-dimensional mesh intersecting the first segment.

Clause 38: The method of any of clauses 36-37, wherein overlaying the two-dimensional mesh on the three-dimensional mesh includes: identifying a third segment also comprising the vertex, the third segment corresponding to the two-dimensional mesh, the third segment and the first segment not being the same segment; and identifying segments of the three-dimensional mesh intersecting the third segment, by breadth-first searching adjacent segments of the three-dimensional mesh based at least in part on the connectivity information.

Clause 39: One or more non-transitory computer-readable media comprising computer-executable instructions that, when executed by one or more processors, cause the one or more processors to perform the method of any one of clauses 29-38.

Clause 40: A computerized system, comprising: a memory configured to store computer-executable instructions; and one or more processors in communication with the memory and configured to access the memory and execute the computer-executable instructions to perform the method of any one of clauses 29-38.

FIG. 11 illustrates an example architecture or environment 1100 configured to implement techniques described herein, according to at least one example. In some examples, the example architecture 1100 may further be configured to enable a user device 1106 and service provider computer 1102 to share information. The service provider computer 1102 is an example of the map server 222 and the map vendors 242, 252. The user device 1106 is an example of the user devices 202. In some examples, the devices may be connected via one or more networks 1108 (e.g., via Bluetooth, WiFi, the Internet). In some examples, the service provider computer 1102 may be configured to implement at least some of the techniques described herein with reference to the user device 1106 and vice versa.

In some examples, the networks 1108 may include any one or a combination of many different types of networks, such as cable networks, the Internet, wireless networks, cellular networks, satellite networks, other private and/or public networks, or any combination thereof While the illustrated example represents the user device 1106 accessing the service provider computer 1102 via the networks 1108, the described techniques may equally apply in instances where the user device 1106 interacts with the service provider computer 1102 over a landline phone, via a kiosk, or in any other manner. It is also noted that the described techniques may apply in other client/server arrangements (e.g., set-top boxes), as well as in non-client/ server arrangements (e.g., locally stored applications, peer-to-peer configurations).

As noted above, the user device 1106 may be any type of computing device such as, but not limited to, a mobile phone, a smartphone, a personal digital assistant (PDA), a laptop computer, a desktop computer, a thin-client device, a tablet computer, a wearable device such as a smart watch, or the like. In some examples, the user device 1106 may be in communication with the service provider computer 1102 via the network 1108, or via other network connections.

In one illustrative configuration, the user device 1106 may include at least one memory 1114 and one or more processing units (or processor(s)) 1116. The processor(s) 1116 may be implemented as appropriate in hardware, computer-executable instructions, firmware, or combinations thereof. Computer-executable instruction or firmware implementations of the processor(s) 1116 may include computer-executable or machine-executable instructions written in any suitable programming language to perform the various functions described. The user device 1106 may also include geo-location devices (e.g., a global positioning system (GPS) device or the like) for providing and/or recording geographic location information associated with the user device 1106.

The memory 1114 may store program instructions that are loadable and executable on the processor(s) 1116, as well as data generated during the execution of these programs. Depending on the configuration and type of the user device 1106, the memory 1114 may be volatile (such as random access memory (RAM)) and/or non-volatile (such as read-only memory (ROM), flash memory). The user device 1106 may also include additional removable storage and/or non-removable storage 1126 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1114 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 1114 and the additional storage 1126, both removable and non-removable, are all examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 1114 and the additional storage 1126 are both examples of non-transitory computer-storage media. Additional types of computer-storage media that may be present in the user device 1106 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 1106. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 1106 may also contain communications connection(s) 1128 that allow the user device 1106 to communicate with a data store, another computing device or server, user terminals, and/or other devices via the network 1108. The user device 1106 may also include I/O device(s) 1130, such as a keyboard, a mouse, a pen, a voice input device, a touch screen input device, a display, speakers, and a printer.

Turning to the contents of the memory 1114 in more detail, the memory 1114 may include an operating system 1113 and/or one or more application programs or services for implementing the features disclosed herein such as applications 1111 (e.g., the map engine 204, client apps 206, health application, digital wallet, third-party applications, browser application). In some examples, the applications 1111 may include map-related applications (e.g., the map engine 204, client apps 206) to perform similar techniques as described with reference to the user device 1106. Applications 1111 (e.g., the map engine 204, client apps 206) can perform some or all the techniques as described with reference to the processes 300, 400, 500, 600, 700. Similarly, at least some techniques described with reference to the service provider computer 1102 may be performed by the user device 1106.

The service provider computer 1102 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, or a virtual machine instance. In some examples, the service provider computer 1102 may be in communication with the user device 1106 via the network 1108, or via other network connections.

In one illustrative configuration, the service provider computer 1102 may include at least one memory 1142 and one or more processing units (or processor(s)) 1144. The processor(s) 1144 may be implemented as appropriate in hardware, computer-executable instructions, firmware, or combinations thereof. Computer-executable instruction or firmware implementations of the processor(s) 1144 may include computer-executable or machine-executable instructions written in any suitable programming language to perform the various functions described.

The memory 1142 may store program instructions that are loadable and executable on the processor(s) 1144, as well as data generated during the execution of these programs. Depending on the configuration and type of service provider computer 1102, the memory 1142 may be volatile (such as RAM) and/or non-volatile (such as ROM and flash memory). The service provider computer 1102 may also include additional removable storage and/or non-removable storage 1146 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1142 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 1142 and the additional storage 1146, both removable and non-removable, are both additional examples of non-transitory computer-readable storage media.

The service provider computer 1102 may also contain communications connection(s) 1148 that allow the service provider computer 1102 to communicate with a data store, another computing device or server, user terminals, and/or other devices via the network 1108. The service provider computer 1102 may also include I/O device(s) 1150, such as a keyboard, a mouse, a pen, a voice input device, a touch input device, a display, speakers, and a printer.

Turning to the contents of the memory 1142 in more detail, the memory 1142 may include an operating system 1152 and/or one or more application programs 1141 or services for implementing the features disclosed herein. For example, the services and applications associated with or corresponding to the map server 222, and map vendors 242, 252 correspond to applications 1141 on the service providers 1102, such that the server devices 220, 240, 250 may include other applications for other features and/or services. Applications 1141 (e.g., the map server 222) can perform some or all of the techniques as described with reference to the processes 300, 400, 500, 600, 700.

The various examples can be further implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, keypad), and at least one output device (e.g., a display device, printer, speaker). Such a system may also include one or more storage devices, such as disk drives, optical storage devices, and solid-state storage devices such as RAM or ROM, as well as removable media devices, memory cards, flash cards, etc.

Such devices can also include a computer-readable storage media reader, a communications device (e.g., a modem, a network card (wireless or wired), an infrared communication device), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data available from various sources to provide a comprehensive and complete window to a user's personal health record. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter IDs, home addresses, data or records relating to a user's health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide enhancements to a user's personal health record. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method, comprising:

receiving, by a computing device, a first two-dimensional polygon, the first two-dimensional polygon being associated with a geographic area on a map;

generating, by the computing device, a second two-dimensional polygon based at least in part on the first two-dimensional polygon, wherein a two-dimensional tint band user interface element is defined as an area between the first two-dimensional polygon and the second two-dimensional polygon, wherein a first boundary of the first two-dimensional polygon corresponds to a third boundary of the two-dimensional tint band user interface element and a second boundary of the second two-dimensional polygon corresponds to a fourth boundary of the two-dimensional tint band user interface element; and generating, by the computing device, a three-dimensional tint band mesh by overlaying the two-dimensional tint band user interface element on a three-dimensional mesh corresponding to the map.

2. The method of claim 1, further comprising refining the three-dimensional tint band mesh based at least in part on the first two-dimensional polygon.

3. The method of claim 1, further comprising refining each vertex of the three-dimensional tint band mesh based at least in part on medial axis information associated with the first two-dimensional polygon.

4. The method of claim 1, further comprising refining each vertex of the three-dimensional tint band mesh based at least in part on medial axis information associated with the first two-dimensional polygon and a signed distance of each vertex in relation to the first two-dimensional polygon.

5. The method of claim 1, wherein the three-dimensional mesh corresponding to the map is a lower resolution version of a three-dimensional mesh used on the map.

6. A computing system, comprising:

a memory configured to store computer-executable instructions; and one or more processors in communication with the memory and configured to access the memory and execute the computer-executable instructions to:

receive a first two-dimensional polygon, the first two-dimensional polygon being associated with a geographic area on a map;

generate a second two-dimensional polygon based at least in part on the first two-dimensional polygon, wherein a two-dimensional tint band user interface element is defined as an area between the first two-dimensional polygon and the second two-dimensional polygon, wherein a first boundary of the first two-dimensional polygon corresponds to a third boundary of the two-dimensional tint band user interface element and a second boundary of the second two-dimensional polygon corresponds to a fourth boundary of the two-dimensional tint band user interface element; and generate a three-dimensional tint band mesh by overlaying the two-dimensional tint band user interface element on a three-dimensional mesh corresponding to the map.

7. The computing system of claim 6, wherein the one or more processors in communication with the memory is further configured to access the memory and execute the computer-executable instructions to generate medial axis information associated with the first two-dimensional polygon.

8. The computing system of claim 7, wherein the one or more processors in communication with the memory is further configured to access the memory and execute the computer-executable instructions to adjust a width of the three-dimensional tint band mesh based at least in part on the medial axis information.

9. The computing system of claim 7, wherein the one or more processors in communication with the memory is further configured to access the memory and execute the computer-executable instructions to adjust the three-dimensional tint band mesh when zooming on the map based at least in part on the medial axis information.

10. The computing system of claim 6, wherein the one or more processors in communication with the memory is further configured to access the memory and execute the computer-executable instructions to:

receive a request to update a zoom level of the map; and generate a second three-dimensional tint band mesh by overlaying the two-dimensional tint band user interface element on a second three-dimensional mesh, the second three-dimensional mesh corresponding to the updated zoom level of the map.

11. The computing system of claim 6, wherein the first two-dimensional polygon is enclosed within the second two-dimensional polygon, the second two-dimensional polygon forming an outer boundary of the two-dimensional tint band user interface element.

12. One or more non-transitory computer-readable media comprising computer-executable instructions that, when executed by one or more processors, cause the one or more processors to perform operations comprising:

receiving, by a computing device, a first two-dimensional polygon, the first two-dimensional polygon being associated with a geographic area on a map;

generating, by the computing device, a second two-dimensional polygon based at least in part on the first two-dimensional polygon, wherein a two-dimensional tint band user interface element is defined as an area between the first two-dimensional polygon and the second two-dimensional polygon, wherein a first boundary of the first two-dimensional polygon corresponds to a third boundary of the two-dimensional tint band user interface element and a second boundary of the second two-dimensional polygon corresponds to a fourth boundary of the two-dimensional tint band user interface element; and generating, by the computing device, a three-dimensional tint band mesh by overlaying the two-dimensional tint band user interface element on a three-dimensional mesh corresponding to the map.

13. The one or more non-transitory computer-readable media of claim 12, further comprising additional computer-executable instructions that, when executed by one or more processors, cause the one or more processors to perform operations comprising:

receiving, by the computing device, a second three-dimensional mesh corresponding to the map, the second three-dimensional mesh comprising a first set of segments, the second three-dimensional mesh including connectivity information identifying how segments of the first set of segments are connected; and overlaying, by the computing device, the two-dimensional tint band user interface element on the second three-dimensional mesh based at least upon the connectivity information of the second three-dimensional mesh.

14. The one or more non-transitory computer-readable media of claim 13, wherein each segment of the first set of segments comprises vertices; and wherein the connectivity information includes which segments are comprised of which vertices.

15. The one or more non-transitory computer-readable media of claim 13, wherein the connectivity information includes which segments of the first set of segments are adjacent to which other segments of the first set of segments.

16. The one or more non-transitory computer-readable media of claim 13, wherein the second three-dimensional mesh corresponds to a terrain mesh associated with a map.

17. The one or more non-transitory computer-readable media of claim 13, wherein the two-dimensional tint band user interface element comprises a second set of segments, the two-dimensional tint band user interface element including second connectivity information identifying how segments of the second set of segments are connected.

18. The one or more non-transitory computer-readable media of claim 13, wherein overlaying the two-dimensional tint band user interface element on the second three-dimensional mesh includes:

identifying a first segment of the two-dimensional tint band user interface element, the first segment comprising a vertex;

identifying a second segment containing the vertex, the second segment associated with the second three-dimensional mesh; and identifying segments of the second three-dimensional mesh intersecting the first segment, by breadth-first searching adjacent segments of the second three-dimensional mesh based at least in part on the connectivity information, beginning with the adjacent segments of the second segment.

19. The one or more non-transitory computer-readable media of claim 18, wherein overlaying the two-dimensional tint band user interface element on the second three-dimensional mesh further includes:

clipping the first segment against the segments of the second three-dimensional mesh intersecting the first segment.

20. The one or more non-transitory computer-readable media of claim 19, wherein overlaying the two-dimensional tint band user interface element on the second three-dimensional mesh further includes:

identifying a third segment also comprising the vertex, the third segment corresponding to the two-dimensional tint band user interface element, the third segment and the first segment not being the same segment; and identifying segments of the second three-dimensional mesh intersecting the third segment, by breadth-first searching adjacent segments of the two-dimensional tint band user interface element based at least in part on the connectivity information, beginning with the adjacent segments of the third segment.

* * * * *